(12) United States Patent
Ezawa et al.

(10) Patent No.: US 7,260,041 B2
(45) Date of Patent: Aug. 21, 2007

(54) DISK DRIVE

(75) Inventors: Kozo Ezawa, Hirakata (JP); Takeo Santo, Hirakata (JP); Masahiro Inata, Itami (JP); Yoshito Saji, Ashiya (JP); Masuo Maruyama, Moriguchi (JP); Teruyuki Takizawa, Neyagawa (JP); Yukio Morioka, Katano (JP); Tadashi Kuroda, Kobe (JP); Goro Naoki, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 698 days.

(21) Appl. No.: 10/850,033

(22) Filed: May 20, 2004

(65) Prior Publication Data

US 2004/0246848 A1 Dec. 9, 2004

(30) Foreign Application Priority Data

May 20, 2003 (JP) ............................... 2003-142480

(51) Int. Cl.
G11B 7/085 (2006.01)

(52) U.S. Cl. ...................... 369/53.2; 369/30.3; 720/663

(58) Field of Classification Search ............... 369/53.2, 369/30.3, 30.27, 219.1, 215.1, 30.88, 30.01, 369/30.93, 30.33, 31.01, 13.28; 720/633, 720/676, 668, 669
See application file for complete search history.

(56) References Cited

U.S. PATENT DOCUMENTS

| 6,175,545 B1* | 1/2001 | Akama et al. ............... 720/663 |
| 6,188,665 B1* | 2/2001 | Furusawa .................... 720/663 |
| 7,188,349 B2* | 3/2007 | Ezawa et al. ................ 720/669 |

FOREIGN PATENT DOCUMENTS

| JP | 2943918 | 6/1999 |
| JP | 2000-30264 | 1/2000 |
| WO | WO 03/032303 | 4/2003 |

* cited by examiner

Primary Examiner—Ali Neyzari
(74) Attorney, Agent, or Firm—RatnerPrestia

(57) ABSTRACT

A disk drive includes a plurality of optical heads corresponding to a plurality kind of disks, and a disk distinction device for distinguishing whether a set disk is a first disk or a second disk when a disk is set on a disk tray, a first disk tray conveying mechanism for the first disk and/or the second disk tray conveying mechanism for the second disk conveys the disk tray to a first tray position in which recording and/or reproducing is performed on the first tray or the second tray position in which recording and/or reproducing is performed on the second tray, according to a result distinguished by the disk distinction device, thereby, an optical head corresponding to a disk set to the disk tray is selected correctly and a recording or reproducing operation is performed on the disk.

40 Claims, 24 Drawing Sheets

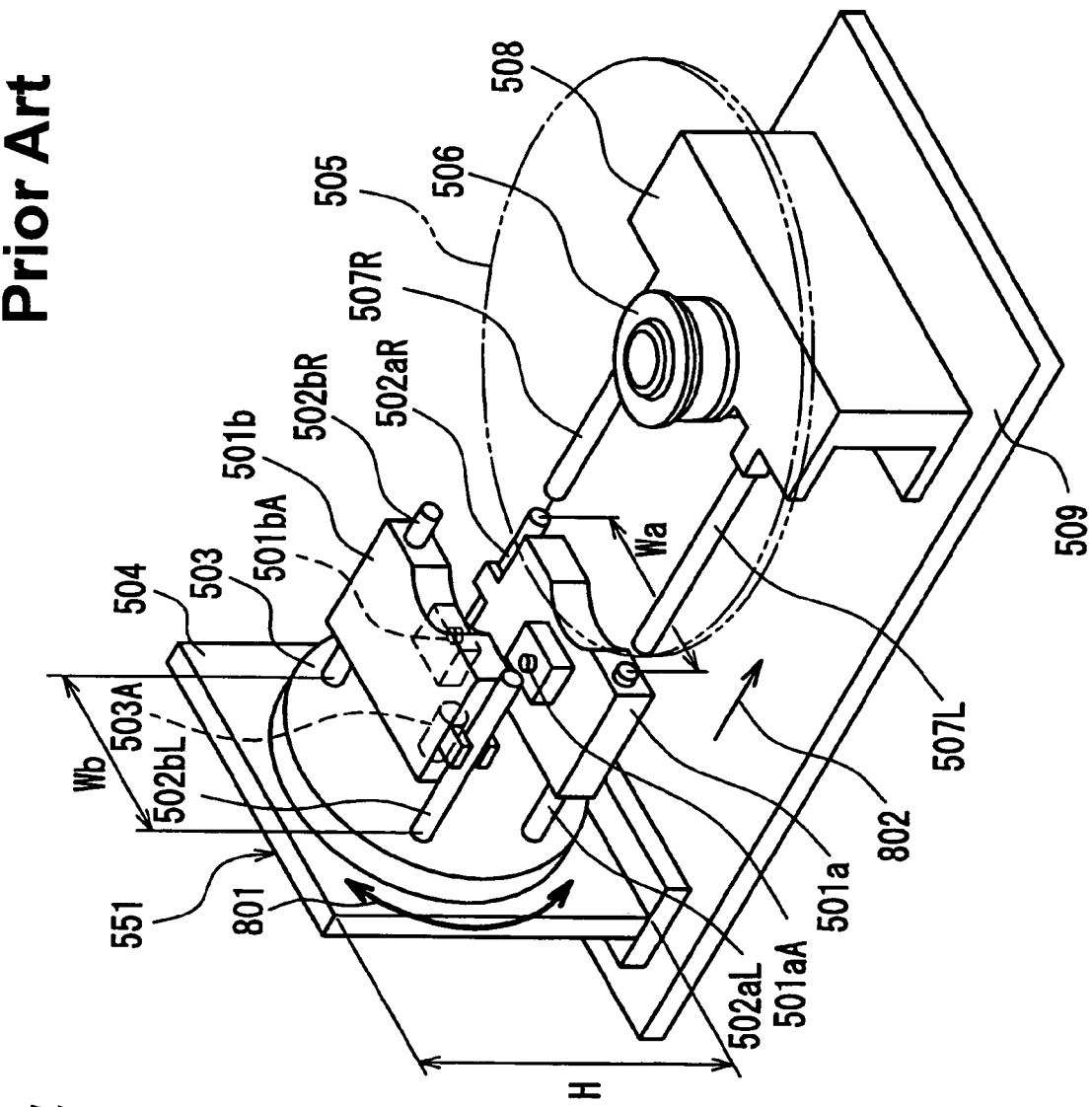

DISK DRIVE

BACKGROUND OF THE INVENTION

1. Field of the Invention

The present invention relates to a disk drive which includes a plurality of optical heads for performing a recording and/or reproducing operation of a data on an optical disk by light, and selects an optical head to be used depending on a condition so as to perform the recording and/or reproducing operation of the data on the optical disk corresponding to the optical head.

2. Description of the Background Art

A recording/reproducing optical disk drive in which a recording or reproducing operation is performed, by using optical beam, on a disk-shaped recording medium such as CD or DVD having further high recording density, and an optical disk medium used in the above disk drive have been widespread use. In addition, recently, technology for further high recording density has been increasingly developed.

As recording and reproducing type of the device and the medium, there are various kinds depending on its usage such as read-only type, recordable type or rewritable type. As seen in a relation between CD and DVD, the recording/reproducing forms has been widely ranged in view of a difference of a wavelength of a light source used in the recording/reproducing operation.

Thus, there are wide variety of optical disk drives and optical disk media used therein in the present circumstances, and the device and medium have to correspond to each recording and reproducing operations. Among the devices, especially an optical head which directly emits and receives optical beam is ideally constituted by one head which can correspond to the various recording and reproducing forms or recording density.

However, it is difficult for the optical head to have characteristics required for each of the combinations of a plurality of wavelengths and various kinds of optical systems in many cases. As a result, sufficient performance margin cannot be provided and its characteristics are varied because of a subtle working condition and then it becomes unusable in some cases. In order to avoid the above-mentioned problems, it is preferable in many cases that a plurality of optical heads which specialize wavelength of the optical beam or the optical system are used and a recording or reproducing operation is performed on a disk corresponding to a specific optical head in view of a size of the optical head, reliability margin, manufacturing and adjustment cost, or cost of parts. In other words, it is preferable that each optical head corresponding to a standard of the recording/reproducing system to be used is mounted on the device as it is.

From this point of view, a constitution of a disk drive on which a plurality of optical heads corresponding to respective standards are mounted is disclosed in Japanese Patent No. 2943918, for example.

FIG. 24 is a perspective view showing the conventional optical disk.

A description is made of a schematic constitution of this example. According to this example, there is provided an optical disk drive which comprises two optical heads and performs a recording or reproducing operation on an optical disk corresponding to each of the optical heads.

Reference numerals 501a and 501b designate a first optical head and a second optical head each corresponding to the optical disk on which the recording or reproducing operation can be performed in the optical disk drive in this example, reference numerals 502aL and 502aR designate first small guide shafts for supporting the first optical head 501a when housed, and reference numerals 502bL and 502bR designate second small guide shafts for supporting the second optical head 501b when housed. The first small guide shafts 502aL and 502aR and the second small guide shafts 502bL and 502bR constitute an optical head housing part 551 together with a rotating plate 503 and a support base 504. The rotating plate 503 is supported by the support base 504 so as to be rotated around a turn spindle 503A by rotating means (not shown) in the direction of an arrow 801. In addition, the first small guide shafts 502aL and 502aR and the second small guide shafts 502bL and 502bR are provided so as to be parallel to each other and perpendicular to the rotating plate 503. A distance between a plane surface containing the first small guide shafts 502aL and 502aR and the turn spindle 503A is equal to a distance between a plan surface containing the second small guide shafts 502bL and 502bR and the turn spindle 503A.

Reference numeral 505 designates an optical disk on which the recording or reproducing operation is performed in the device, reference numeral 506 designates a disk motor for rotating the optical disk 505, reference numerals 507L and 507R designate guide shafts for guiding the first optical head 501a or the second optical head 501b in one radius direction of the optical disk 505 when the recording or reproducing operation is performed on the optical disk 505, and reference numeral 508 designates a transport support which integrally supports the disk motor 506, and the guide shafts 507L and 507R. In addition, the support base 504 and the transport support 508 are supported by a base board 509.

The optical heads 501a and 501b are transported by transport driving means (not shown) over the guide shafts 507L and 507R so that it can scan the optical disk 505 in one radius direction to perform the recording or the reading operation.

A function or an operation of each component is described hereinafter.

The first optical head 501a and the second optical head 501b are housed in the optical head housing part 551 while supported by the first small guide shafts 502aL and 502aR, and the second small guide shafts 502bL and 502bR, respectively. At this time, objective lenses 501aA and 501bA of the optical heads 501a and 501b, respectively are opposed to each other in the optical head housing part 551.

Referring to FIG. 24, the small guide shaft 502aL and the guide shaft 507L, and the small guide shaft 502aR and the guide shaft 507R are linearly arranged, respectively. The first optical head 501a is moved from the housing part 551 to the side of the transport support 508 in the direction of an arrow 802 and the first optical head 501a can be transported on the guide shafts 507L and 507R so as to perform the recording or reproducing operation on the optical disk 505 by using the first optical head 501a.

In addition, when the rotating plate 503 is rotated by the rotation driving means (not shown) in either direction of the directions of arrows 801, by 180 degrees, the small guide shaft 502bR and the guide shaft 507L, and the small guide shaft 502bL and the guide shaft 507R are linearly arranged, respectively. Then, the second optical head 501b is moved from the housing part 551 to the side of the transport support 508 in the direction of the arrow 802, so that the second optical head 501b can be transported on the guide shafts 507L and 507R so as to perform the recording or reproducing operation on the optical disk 505 by using the second optical head 501b.

When each optical head completes the recording or the reproducing operation, or when the optical head is to be exchanged with the other optical head after the optical head is moved to the side of the transport support 508, for example, because it is determined that the optical head cannot perform the recording or reproducing operation as a result of detection of the kind of the optical head set on the disk motor 506 by the optical head on the side of the transport support 508, the above process is reversely performed, that is, the optical head is moved from the transport support 508 to the housing part 551 and the other optical head is moved from the housing part 551 to the transport support 508 again.

According to the above device, when the recording or reproducing operation is performed on the specific optical disk 505, for example, either one of the first optical head 501a or the second optical head 501b is selected and moved to the side of the transport support 508. Prior to this operation, it is necessary to distinguish the kind of the optical disk 505 in order to determine which one of the first optical head 501a and the second optical head 501b is appropriate to be used.

However, in the above-mentioned prior art, the disk corresponding to both the first optical head 501a and the second optical head 501b, is a type of disk which does not use a containing case or the like, that is, a so-called bare disk. Therefore, it is necessary to determine that the optical head is appropriate to the disk or not by mounting one optical head to the transport support 508, performing the recording or reproducing operation and reading a focus signal or a tracking signal, for example. At this time, although the recording and/or reproducing operation can be continued when the mounted optical head is appropriate, the optical head has to be exchanged with the other one when it is not appropriate. In this case, time for starting the recording or reproducing operation is delayed for that. Thus, when a user wants to record data, its timing could be lost. It is to be noted that the wording of "recording and/or reproducing" means "at least one of recording and reproducing" in the specification.

SUMMARY OF THE INVENTION

The present invention was made in order to solve the above-mentioned problems and it is an object of the present invention to provide a disk drive including a plurality of optical heads corresponding to various kinds of disks, in which the optical head is correctly selected depending on the kind of the set disk to perform a recording and/or reproducing operation.

In order to attain the above object, the present invention provides desk drives as follows.

A first disk drive according to a first aspect of the present invention includes a first disk rotating mechanism for supporting and rotating a first disk on which data can be recorded and/or reproduced by a first optical beam, a first optical head emitting the first optical beam to perform a recording and/or reproducing operation on the first disk, a first optical head moving mechanism for moving the first optical head in the substantially radial direction of the first disk, a second disk rotating mechanism for supporting and rotating a second disk on which data can be recorded and/or reproduced by a second optical beam, a second optical head emitting the second optical beam to perform a recording and/or reproducing operation on the second disk, a second optical head moving mechanism for moving the second optical head in the substantially radial direction of the second disk, a transport base on which the first disk rotating mechanism, the first optical head, the first optical head moving mechanism, the second disk rotating mechanism, the second optical head, and the second optical head moving mechanism are mounted, a disk tray conveyed to a first tray position in which the recording and/or reproducing operation is performed on the first disk, a second tray position in which the recording and/or reproducing operation is performed on the second disk, and a third tray position in which the first disk and the second disk are set or taken out, a first disk tray conveying mechanism for conveying the disk tray in a first direction which is substantially perpendicular to a line connecting a rotation center of the first disk in the first tray position and a rotation center of the second disk in the second tray position and which is substantially parallel to the first disk surface and the second disk surface, a second disk tray conveying mechanism for conveying the disk tray in a second direction which is parallel to the line connecting the rotation center of the first disk in the first tray position and the rotation center of the second disk in the second tray position and which is substantially parallel to the first disk surface and the second disk surface, and disk distinction device for distinguishing whether the set disk is the first disk or the second disk when the disk is set on the disk tray, in which the first disk tray conveying mechanism and/or the second disk tray conveying mechanism conveys the disk tray to the first tray position or the second tray position according to a result determined by the disk distinction device.

According to the first aspect of the present invention, since the disk distinction device distinguishes that the disk is the first disk or the second disk by setting the disk onto the disk tray, the disk can be conveyed to the position in which the optical head corresponding to the disk is provided without an error. Therefore, it can be prevented that the recording or reproducing operation is stopped and the disk is conveyed again, which is caused by mismatch between the disk and the optical head. As a result, a time until the recording and/or reproducing operation is started on the disk can be prevented from being elongated.

A second disk drive according to a second aspect of the present invention includes a first disk rotating mechanism for supporting and rotating a first disk on which data can be recorded and/or reproduced by a first optical beam, a first optical head emitting the first optical beam to perform a recording and/or reproducing operation on the first disk, a first optical head moving mechanism for moving the first optical head in the substantially radial direction of the first disk, a second disk rotating mechanism for supporting and rotating a second disk on which data can be recorded and/or reproduced by a second optical beam, a second optical head emitting the second optical beam to perform a recording and/or reproducing operation on the second disk, a second optical head moving mechanism for moving the second optical head in the substantially radial direction of the second disk, a transport base on which the first disk rotating mechanism, the first optical head, the first optical head moving mechanism, the second disk rotating mechanism, the second optical head, and the second optical head moving mechanism are mounted, a disk tray conveyed to a first tray position in which the recording and/or reproducing operation is performed on the first disk, a second tray position in which the recording and/or reproducing operation is performed on the second disk, and a third tray position in which the first disk and the second disk are set or taken out, a first disk tray conveying mechanism for conveying the disk tray in a first direction which is substantially perpendicular to a line connecting a rotation center of the first disk in the first tray position and a rotation center of the second disk in the second tray position and which is substantially parallel to the first disk surface and the second disk surface, a second disk tray conveying mechanism for conveying the disk tray in a second direction which is parallel to the line connecting the rotation center of the first disk in the first tray position and the rotation center of the second disk in the second tray position and which is substantially parallel to the first disk surface and the second disk surface, a first start-point detection device and a first end-point detection device for detecting whether the disk tray exists in a start-point position and a end-point position of a conveyance path of the disk tray along the first direction or not, respectively, and a second start-point detection device and a second end-point detection device for detecting whether the disk tray exists in a start-point position and a end-point position of a conveyance path of the disk tray along the second direction or not, respectively.

According to the second aspect of the present invention, since it includes the first start-point detection device and the first end-point detection device for detecting the position of the disk tray in the first direction, and the second start-point detection device and the second end-point detection device for detecting the position of the disk tray in the second direction, the position of the disk tray can be accurately detected, so that malfunction can be avoided.

A third disk drive according to a third aspect of the present invention includes a disk rotating mechanism for supporting and rotating a disk, a plurality of optical heads emitting an optical beam to perform recording and/or reproducing operation on the disk, optical head guiding mechanism for guiding the optical head in almost a radius direction of the disk, a transport unit comprising the disk rotating mechanism, the optical head guiding mechanism, and a transport base on which the disk rotating mechanism and the optical head guiding mechanism are mounted, optical head housing mechanism arranged on the side opposite to the disk rotating mechanism with respect to the optical head guiding mechanism, for housing the plurality of optical heads, a disk tray conveyed to a first tray position in which the disk is supported and rotated by the disk rotating mechanism and a second tray position in which the disk is set or taken out, and disk distinction device for distinguishing the kind of the set disk and selecting the optical head for performing the recording and/or reproducing operation on the set disk from the plurality of optical heads when the disk is set on the disk tray, in which the transport unit or the optical head housing mechanism is moved so that the optical head selected by the disk distinction device can be linearly moved from the optical head housing mechanism to the transport unit.

According to the third aspect of the present invention, since the disk distinction device distinguishes the kind of the disk by setting the disk onto the disk tray and selects the optical head for recording and reproducing on the set disk from the plurality of optical heads, it can be avoided that the recording and/or reproducing operation is stopped and the optical head has to be exchanged, which is caused by mismatch between the disk and the optical head. As a result, the time until the recording and/or reproducing operation is started on the disk can be prevented from being elongated.

In a disk drive according to the first or second aspect of the present invention, preferably, the first disk tray conveying mechanism conveys the disk tray between the first position and the third position, and the second disk tray conveying mechanism conveys the disk tray between the first position and the second position. As a result, when the optical head which is used more often is set as the first optical head, the time until the recording and/or reproducing on the first disk is started can be shortened.

Further, in a disk drive according to the first or second aspect of the present invention, it is preferable that the first tray position, the second tray position and the third tray position are in substantially the same plane. Thus, the mechanism for moving the disk tray can be simplified and the disk drive can be reduced in thickness.

Furthermore, in a disk drive according to the first or second aspect of the present invention, the transport base may be divided into a first transport base on which the first disk rotating mechanism, the first optical head, and the first optical head moving mechanism are mounted, and a second transport base on which the second disk rotating mechanism, the second optical head, and the second optical head moving mechanism are mounted. Thus, a distance between the disk surface and the optical head can be separately adjusted in an easy manner when a dimension such as a height is different between the first disk rotating mechanism and the second disk rotating mechanism, and between the first optical head and the second optical head, or when only one of the first disk and the second disk is contained in a cartridge.

Furthermore, in any one of the above mentioned disk drives, preferably, the first disk is set to or taken out of the first disk rotating mechanism, and the second disk is set to or taken out of the second disk rotating mechanism when the transport base comes close to or separates from the disk tray, respectively. Thus, the motion of a disk being set to or taken out of a disk rotating mechanism can be performed in corresponding with the motion of a transport base coming close to or separating from a disk tray. Thereby, it is possible to perform those two motions as a series efficiently.

In this case, the transport base may be turnably supported, on an outer circumference side of the first disk or the second disk in generally radial direction thereof, around a shaft having a rotation axis line extends in a direction perpendicular to substantially radial direction of the first disk or the second disk and the rotation axis of the first disk or the second disk. Thus, the first or the second disk can be set to or taken out of the first or the second disk rotating mechanism, by a simple constitution, when the disk tray on which the first or the second disk is mounted is positioned in the first or the second tray position.

In addition, the disk drive preferably includes a lifted end detection device for detecting a state in which the first disk is mounted on the first disk rotating mechanism, or a state in which the second disk is mounted on the second disk rotating mechanism when the transport base comes close to the disk tray, and a lowered end detection device for detecting an end of an operation in which the transport base is separated from the disk tray. By providing with these detection devices, the motion of a transport base coming close to or separating from a disk tray can be detected reliably.

In this case, preferably, the lowered end detection device detects that the transport base is in an end state of the operation for separating from the disk tray when the disk tray is moved between the first tray position and the second tray position, and when the disk tray is moved between the first tray position and the third tray position. Thereby, the disk tray can be moved in a confirmed condition that the transport base is in an end state of the operation for separating from the disk tray.

In addition, more preferably, the first start-point detection device or the first end-point detection device detects that the disk tray is in the start-point position or the end-point position along the first direction when the transport base approaches the disk tray. Thereby, it is possible to confirm the position of the disk tray with respect to the first direction.

In addition, more preferably, the second start-point detection device or the second end-point detection device detects that the disk tray is in the start-point position or the end-point position along the second direction when the transport base approaches the disk tray. Thereby, the approaching motion of the transport base to the disk tray can be performed in a detected condition that the disk tray is in the start-point position or the end-point position along the second direction.

In a disk drive according to the third aspect of the present invention, it is preferable that the direction in which the selected optical head is moved from the optical head housing mechanism to the transport unit is the same as the guiding direction of the optical head by the optical head guiding mechanism. Thereby, the optical head can be easily transported between the optical head housing mechanism and the transport unit.

Further, in the optical head housing mechanism of the third disk drive according to the present invention, it is preferable that the plurality of optical heads are arranged and housed in the optical head housing mechanism such that the optical beam emitted from respective optical heads is in the same direction. Thus, when the optical head is moved between the optical head housing mechanism and the transport unit, since it is not necessary to rotate the optical head, the disk drive can be reduced in thickness, and also the wiring connected to the optical head is not twisted.

Furthermore, in a disk drive according to the third aspect of the present invention, it is preferable that the arranged direction of the plurality of optical heads housed in the optical head housing mechanism is substantially perpendicular to the guiding direction of the optical head by the optical head guiding mechanism. Thus, since the optical head to be mounted on the transport unit can be exchanged by moving the transport unit or the optical head housing mechanism in parallel, the mechanism can be simplified.

In any one of the above mentioned disk drives, the first disk may be contained in a first disk cartridge, and the second disk may be contained in a second disk cartridge having an outer configuration at least a part of which is different from that of the first disk cartridge. In this case, it is possible to achieve the same function and effect as any one of the above mentioned disk drives in a disk so-called cartridge contained-type. In particular, it is possible to distinguish the kind of an optical disk media, by containing the disk in a cartridge having an outer configuration which is different from that of the other disk cartridge, even when both disks are the optical disk media having substantially same outer configuration and recording/reproducing are performed by means of different optical systems respectively.

In this case, the disk distinction device may include a first detection switch and a second detection switch, and any one of a case where the first disk cartridge is set on the disk tray, a case where the second disk cartridge is set on the disk tray and a case where neither the first disk cartridge nor the second disk cartridge is set on the disk tray may be determined by combination of states detected by the first detection switch and the second detection switch. Thereby, it is possible to detect reliably whether a disk cartridge is mounted on the disk tray or not, or which cartridge is mounted on the disk tray.

In any one of the above mentioned disk drives, more preferably, the disk drive further includes media a detection device for detecting that the first disk and/or the second disk, or a first disk cartridge containing the first disk and/or a second disk cartridge containing the second disk are set on the disk tray. Thereby, it is possible to detect reliably whether a disk or a disk cartridge is mounted on the disk tray or not.

In this case, the media detection device may include a light emitting element and a light receiving element and detects whether the disk exists on the disk tray or not based on a detection state of light emitted from the light emitting element, which is received by the light receiving element. Thereby, it is possible to detect easily and reliably whether a disk is mounted on the disk tray or not.

Further, in this case, it is preferable that a light emitting time of the light emitting element or a light receiving time of the light receiving element is only a specific time after the disk tray is moved from the third tray position to the first tray position, or a specific time after the disk tray is moved from the second tray position to the first tray position. Thereby, it is possible to elongate the service life of the media detection device, and also to reduce the energy consumption thereof.

Furthermore, preferably, the disk tray is not moved to the second tray position in a case where the media detection device does not detect any disk or any disk cartridge on the disk tray when the disk tray is moved from the third tray position to the first tray position. Thereby, when any disk or any disk cartridge are not mounted on the disk tray, the vacant disk tray is prevented from performing useless motion.

In any one of the above mentioned disk drives, preferably, the disk drive further includes a first inner circumference detection device for detecting that the first optical head is at the most inner circumference position within a movable range in substantially radial direction of the first disk, and a second inner circumference detection device for detecting that the second optical head is at the most inner circumference position within a movable range in substantially radial direction of the second disk. Thereby, it is possible to detect reliably that the first or the second optical head is at the most inner circumference position respectively.

In this case, more preferably, the first inner circumference detection device and the second inner circumference detection device detect that both the first optical head and the second optical head are at the most inner circumference position when the disk tray is moved between the first tray position and the second tray position, and when the disk tray is moved between the first tray position and the third tray position. Thereby, when the disk tray is moved, it is possible to move the disk tray in a detected condition that both of the first and the second optical heads are at the most inner circumference position.

BRIEF DESCRIPTION OF THE DRAWINGS

FIG. 24 is a perspective view showing a whole constitution of the conventional disk drive.

DESCRIPTION OF THE PREFERRED EMBODIMENTS

Disk drives according to the present invention will be described in detail by referring to the preferred embodiments.

Embodiment 1

Concept of a disk drive according to one embodiment of the present invention is described hereinafter.

The disk drive according to this embodiment can perform a recording and/or reproducing operation in different optical systems, and perform a recording and/or reproducing operation on a first optical disk media 1A and a second optical disk media 1B. These disk media 1A and 1B are bare disks or contained in a type of cartridges having different configurations which is used in "DVD-RAM" (a registered trademark) media, for example, and are recorded and/or reproduced in different optical systems.

Figure 1:
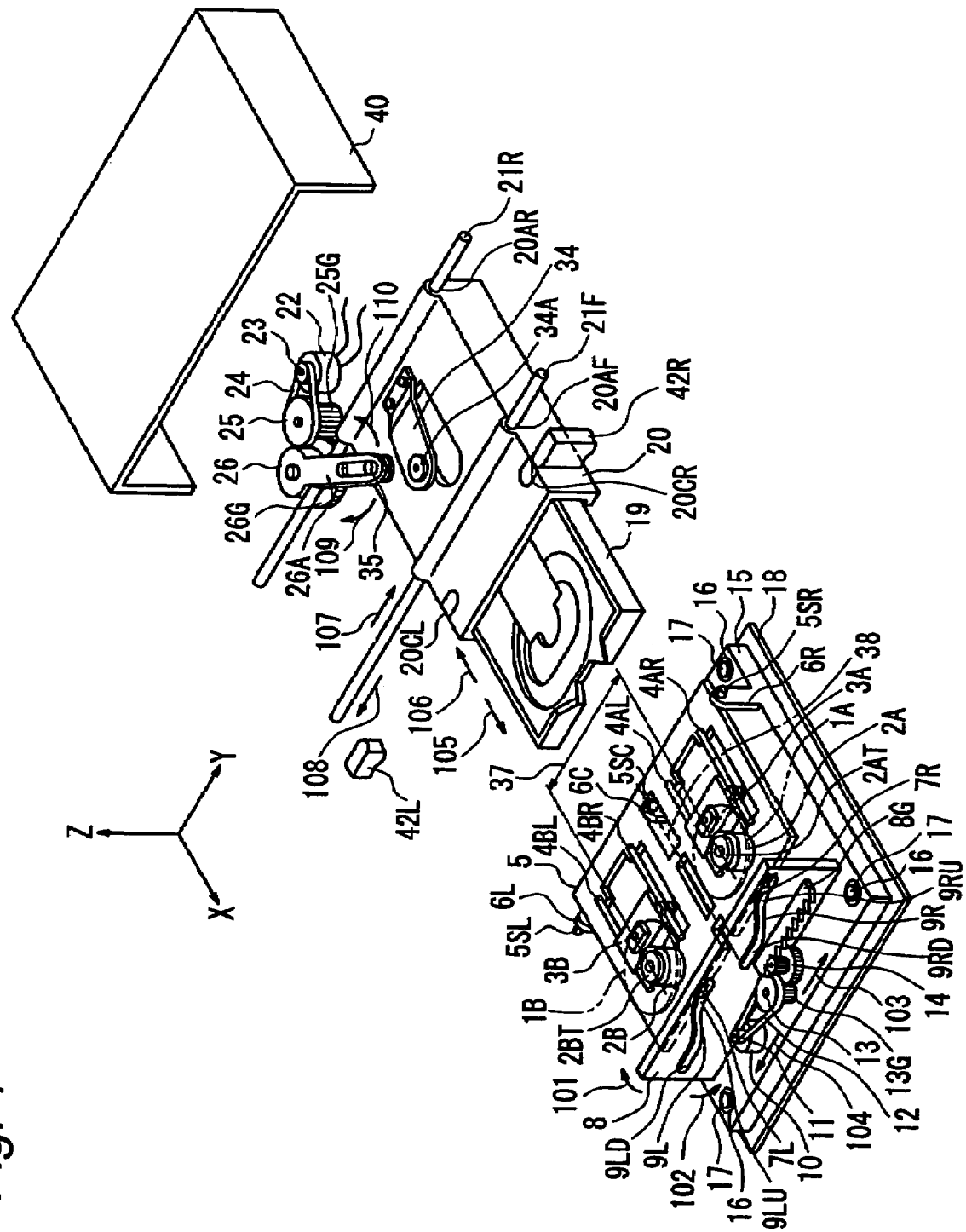
FIG. 1 is an exploded perspective view showing a whole constitution of a disk conveying mechanism of a disk drive according to an embodiment 1 of the present invention.

FIG. 1 is an exploded perspective view showing a whole constitution of a mechanism, in the disk drive, which performs a series of operations in which a disk-shaped record media is conveyed and finally a recording and/or reproducing operation is performed. As shown in FIG. 1, a three-dimensional orthogonal coordinate system is set in which a tracking direction of an optical head to the disk-shaped media is set as X axis, a direction parallel to a disk surface and perpendicular to the X axis (tangential direction) is set as Y axis, and a normal direction of the disk surface is set as Z axis.

Referring to FIG. 1, reference numeral 2A designates a first disk motor for supporting and rotating the first optical disk media 1A, reference numeral 2B designates a second disk motor for supporting and rotating the second optical disk media 1B, reference numeral 3A designates a first optical head for performing a recording and/or reproducing operation on the first optical disk media 1A, reference numeral 3B designates a second optical head for performing a recording and/or reproducing operation on the second optical disk media 1B, reference numerals 4AL and 4AR designate a first left guide shaft and a first right guide shaft, respectively (which constitute a first guide structure) for supporting and guiding the first optical head 3A when the first optical head 3A is moved in a radius direction (X axis direction) of the first optical disk media 1A, reference numerals 4BL and 4BR designate a second left guide shaft and a second right guide shaft, respectively (which constitute a second guide structure) for supporting and guiding the second optical head 3B when the second optical head 3B is moved in a radius direction (X axis direction) of the second optical disk media 1B, and reference numeral 5 designates a transport base which integrally supports all of the above members. Reference numeral 15 designates a mechanical base in which turn spindles 5SL, 5SC and 5SR are supported by support bases 6L, 6C and 6R. The turn spindles 5SL, 5SC and 5SR are linearly arranged in the Y-axis direction and the transport base is held so as to be turned around them in the direction of an arrow 101 or an arrow 102.

Reference numeral 8 designates a slide cam which is movably held on the mechanical base 15 in the direction of an arrow 103 or an arrow 104 which is parallel to Y axis. In the X-axis direction, support pins 7L and 7R are provided at the end of the transport base 5 which is the opposite side supported by the turn spindles 5SL, 5SC and 5SR, and the support pins 7L and 7R are inserted into cam grooves 9L and 9R provided in the slide cam 8, respectively. When the slide cam 8 is moved in the direction of the arrow 103, the support pins 7L and 7R are guided toward lower parts 9LD and 9RD of the cam grooves 9L and 9R, respectively, whereby the transport base 5 is turned in the direction of the arrow 102. In addition, when the slide cam 8 is moved in the direction of the arrow 104, the support pins 7L and 7R are guided toward upper parts 9LU and 9RU of the cam grooves 9L and 9R, respectively, whereby the transport base 5 is turned in the direction of the arrow 101.

Reference numeral 10 designates an elevating motor mounted on the mechanical base 15. Driving force of the elevating motor 10 is transmitted from a elevating motor pulley 11 mounted on a shaft of the elevating motor 10 to a elevating large pulley 13 rotatably mounted on the mechanical base 15 through an elevating belt 12, and then transmitted to a rack gear part 8G provided in the slide cam 8 through an elevating large pulley gear part 13G which is integrally provided with the elevating large pulley 13, an elevating middle gear 14 rotatably mounted on the mechanical base 15. Thus, the slide cam 8 can be moved in the directions of the arrows 103 and 104.

Publicly known systems in a device constitution which is the same kind as the optical disk drive in this embodiment are used in a first transport driving mechanism for guiding and transporting the first optical head 3A by the first left guide shaft 4AL and the first right guide shaft 4AR and a first driving source for driving this, and a second transport driving mechanism for guiding and transporting the second optical head 3B by the second left guide shaft 4BL and the second right guide shaft 4BR and a second driving source for driving this, so that a description for them is omitted. A first optical head moving mechanism includes the first left guide shaft 4AL and the first right guide shaft 4AR (the first guide structure), the first transport driving mechanism, and the first driving source. A second optical head moving mechanism includes the second left guide shaft 4BL and the second right guide shaft 4BR (the second guide structure), the second transport driving mechanism, and the second driving source.

The mechanical base 15 is fixed to a chassis 18 by support screws 17 (at four positions one of which is not shown) through dampers 16 (at four positions one of which is not shown). In addition, only a bottom part of the chassis 18 is shown for simplification in FIG. 1.

Reference numeral 19 designates a media tray on which the first optical disk media 1A or the second optical disk media 1B is set in a state it is contained in a disk cartridge or in a bare disk state it is naked without being contained in the disk cartridge. Reference numeral 20 designates a first tray guide for holding a media tray 19 and for guiding it in the X-axis direction, that is, in the direction of an arrow 105 or 106. Reference numerals 21F and 21R designate second tray guides for holding the first tray guide 20 and for guiding it in the Y-axis direction, that is, in the direction of an arrow 107 or 108. The stick-shaped second tray guides 21F and 21R are inserted into guide holes 20AF and 20AR provided at the first tray guide 20, respectively. The first tray guide 20 conveys the media tray 19 in the direction of the arrow 105 to the outside of the device so that optical disk media can be exchanged, or conveys it in the direction of the arrow 106 so that it can be housed in the device. The second tray guides 21F and 21R convey the media tray 19 with the first tray guide 20 onto the first disk motor 2A or the second disk motor 2B in the device.

Reference numeral 40 designates a top cover for the above components and it is fixed to the chassis 18 to prevent dust from entering from the outside. Especially, when dust is attached to a part directly involving in the recording or reproducing operation, such as the first optical head 3A or the second optical head 3B, its performance could deteriorate. Therefore, it is preferable to exclude an opening to the outside as much as possible.

Then, a description is made of operations in which the first tray guide 20 is conveyed in the Y-axis direction (in the direction of the arrow 107 or 108) integrally with the media tray 19 with reference to FIG. 1. Reference numeral 22 designates a second conveyance driving motor which is a driving source for conveying the first tray guide 20, which is fixed to the mechanical base 15. Reference numeral 25 designates a second conveyance large pulley and reference numeral 26 designates a second conveyance driving arm, which are rotatably supported by the mechanical base 15. Driving force of the second conveyance driving motor 22 is transmitted from a second conveyance driving motor pulley 23 mounted on its shaft to the second conveyance large pulley 25 through a second conveyance belt 24, and transmitted to a second conveyance driving arm gear part 26G which is integrally provided with the second conveyance large pulley 25, by a second conveyance large pulley gear part 25G which is integrally provided with the second conveyance large pulley 25. Thus, a second arm part 26A of the second conveyance driving arm 26 is turned in the direction of an arrow 109 or 110 by obtained torque. Thereby, the first tray guide 20 is conveyed in the direction of the arrow 107 or 108 through a second connection part 35.

Positioning of the first tray guide 20 and the media tray 19 in the Y-axis direction is performed by a first right and left positioning unit 42R and a second right and left positioning unit 42L provided on the mechanical base 15. More specifically, the positioning in the direction of the arrow 107 is performed by putting a first positioning part 20CR provided in a side wall of the first tray guide 20, on the first right and left positioning unit 42R. And, the positioning in the direction of the arrow 108 is performed by putting a second positioning part 20CL provided on a side wall of the first tray guide 20, on the second right and left positioning unit 42L. In addition, the first and second positioning parts 20CR and 20CL on which the first and second right and left positioning units 42R and 42L abut may be provided at the media tray 19.

Figure 2:
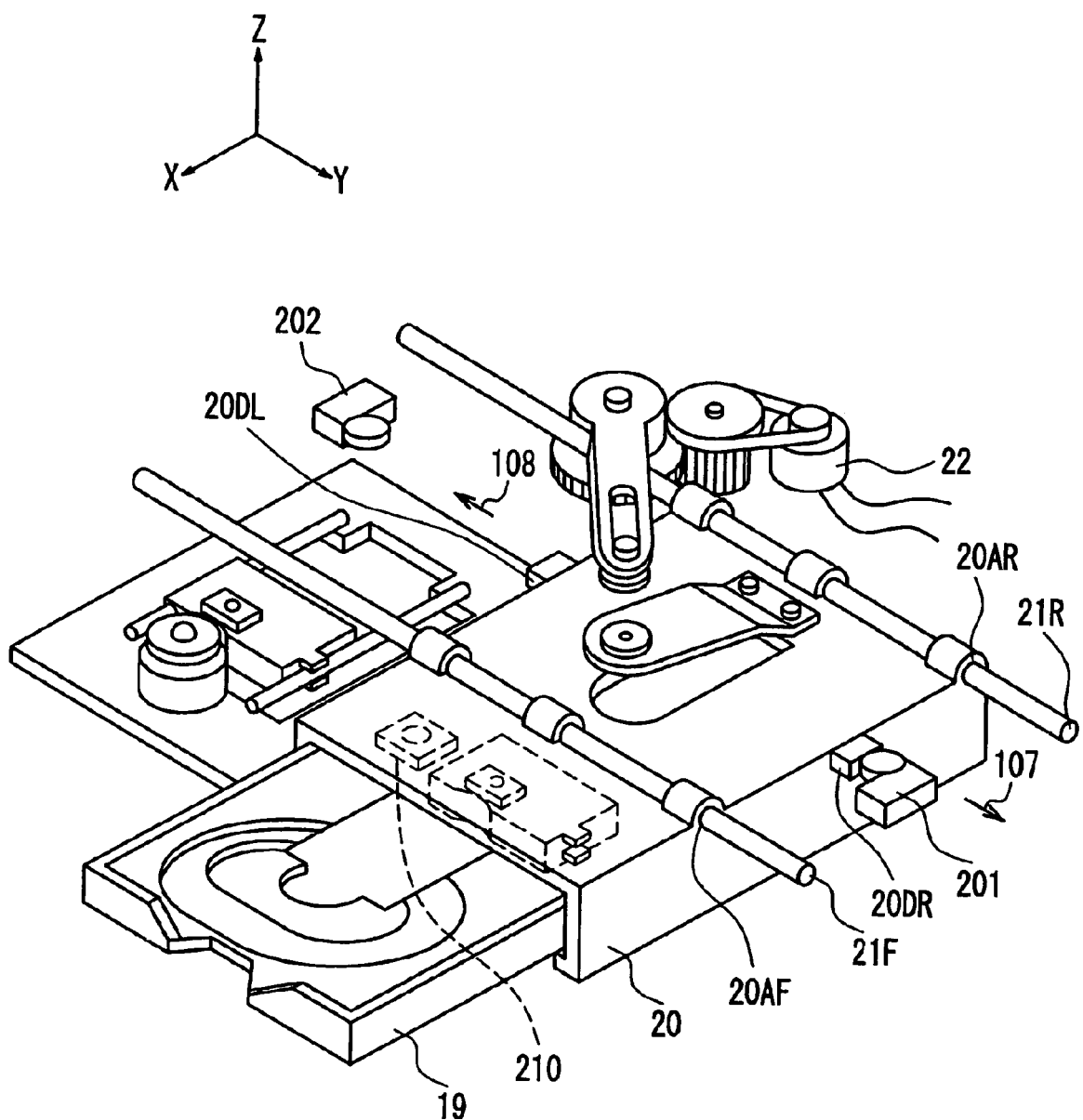
FIG. 2 is a perspective view showing outskirts constitution of a second disk tray conveying mechanism of the disk drive according to the embodiment 1.

Although the guide holes 20AF and 20AR provided in the first tray guide 20 to which the second tray guides 21F and 21R are inserted may be long guide holes which are continuously formed in the Y-axis direction as shown in FIG. 1, they are preferably divided into a plurality of sections in the Y-axis direction as shown in FIG. 2. When the guide holes 20AR and 20AR are continuously formed in the Y-axis direction as shown in FIG. 1, if a degree of straightness of the second tray guides 21F and 21R is low, friction is increasingly generated between inner walls of the guide holes 20AF and 20AR and the second tray guides 21F and 21R, respectively so that a load at the time of conveyance could be increased or sliding could not be smoothly performed. As shown in FIG. 2, this can be avoided by dividing the guide holes 20AF and 20AR into the plural sections in the Y-axis direction.

Furthermore, clearance between the guide holes 20AF and 20AR and the second tray guides 21F and 21R, respectively is preferably small at both ends and large in the center among three guide holes divided in the Y-axis direction in view of guiding precision. The clearance at the center is preferably set so that deflection generated in the second tray guides 21F and 21R due to some reasons may be limited so as not to reach a plastic deformation region.

A description is made of position detection device for the first tray guide 20 and the media tray 19 in the Y-axis direction with reference to FIG. 2. FIG. 2 is a detailed perspective view in which the media tray 19, the first tray guide 20 and the conveying mechanism of the first tray guide 20 in the Y-axis direction in FIG. 1 are extracted. It is to be noted that FIG. 2 shows an example in which the guide holes 20AF and 20AR provided in the first tray guide 20 to which the second tray guides 21F and 21R are inserted is divided into a plurality of sections in the Y-axis direction. Referring to FIG. 2, reference numeral 201 designates a tray guide right end detection switch which detects an end of the first tray guide 20 in the direction of the arrow 107, reference numeral 202 designates a tray guide left end detection switch which detects an end of the first tray guide 20 in the direction of the arrow 108. In addition, reference numeral 20DR designates a right end switch operating projection attached to the first tray guide 20, for operating the tray guide right end detection switch 201, and reference numeral 20DL designates a left end switch operating projection attached to the first tray guide 20, for operating the tray guide left end detection switch 202. By the above detection devices, a fact that the tray guide 20 was conveyed to the end of the conveyance route along Y axis can be detected.

Still further, reference numeral 210 designates a media detection sensor using a photo sensor and the like set on an upper inner wall of the first tray guide 20, which detects whether a disk or a disk cartridge is set on the media tray 19 or not.

In addition, according to this embodiment, although the media detection sensor 210 is shown as a reflective type of photo sensor consists of a single part, for example in FIG. 2, this type is only one example and the present invention is not limited to this. The same effect can be provided by combination of a light emitting element such as a light-emitting diode and a light receiving element such as a photo transistor.

In this case, it is preferable that a voltage for light emission and a voltage for light reception is applied to the light emitting element and the light receiving element only when its detection result is required, in view of the life of the element.

Figure 3A:
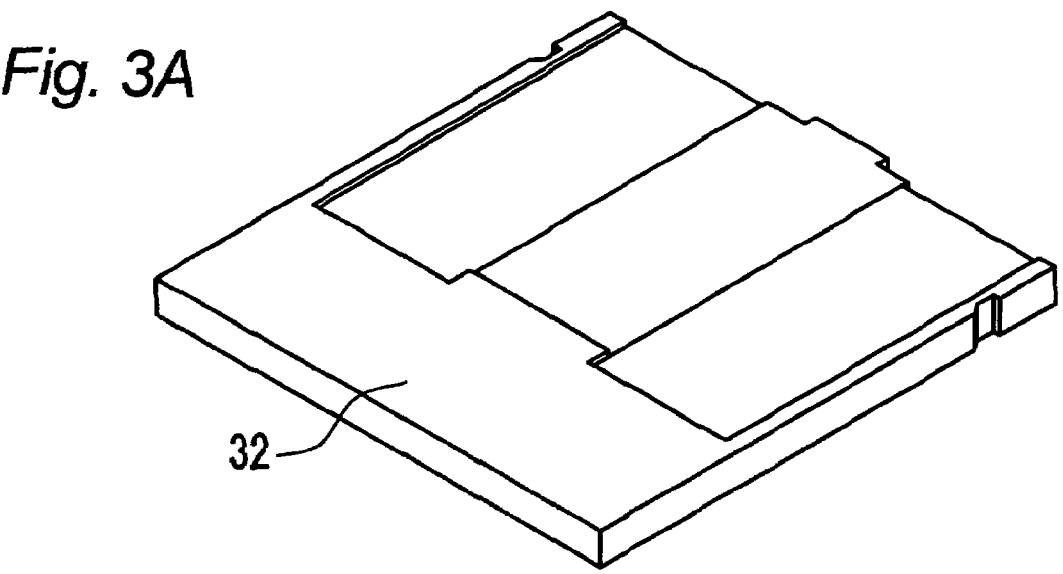
FIG. 3A shows a perspective view of a first disk cartridge used in the disk drive according to the embodiment 1.
Figure 3B:
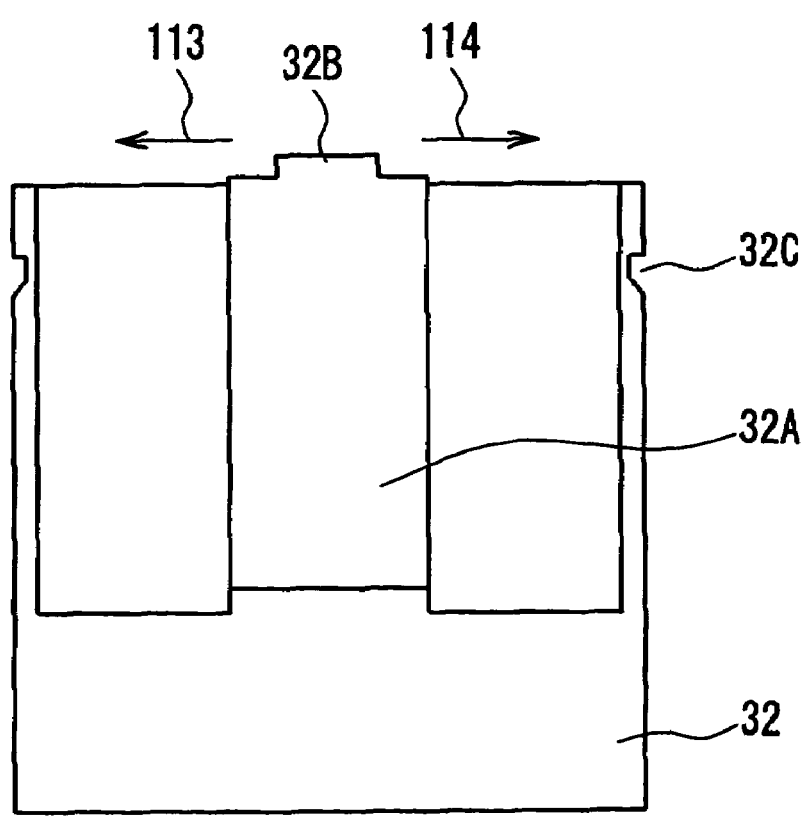
FIG. 3B shows a plan view of the first disk cartridge used in the disk drive according to the embodiment 1.

A description is made of the disk cartridge used in the first optical disk media 1A with reference to FIGS. 3A and 3B. FIG. 3A is its perspective view and FIG. 3B is its plan view. Referring to FIGS. 3A and 3B, reference numeral 32 designates a first disk cartridge, and reference numeral 32A designates a cartridge shutter which discloses/closes the contained disk by opening and closing. When the cartridge shutter 32A is moved in the direction of an arrow 113 or 114 by applying force to a shutter projection 32B, the contained disk is exposed, and when the force is cancelled, it returns to an original position by restoring force of a spring member and the like (not shown) and the disk is closed.

Figure 4A:
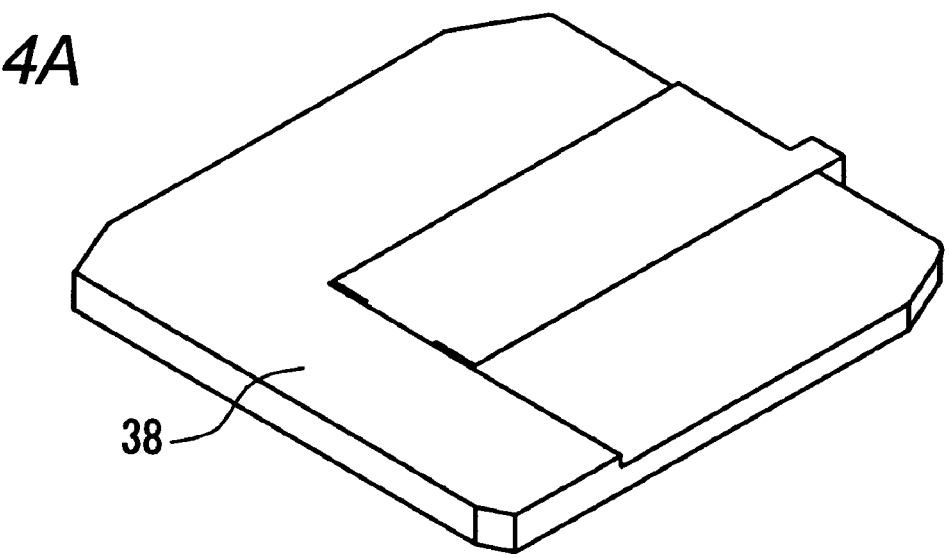
FIG. 4A shows a perspective view of a second disk cartridge used in the disk drive according to the embodiment 1.
Figure 4B:
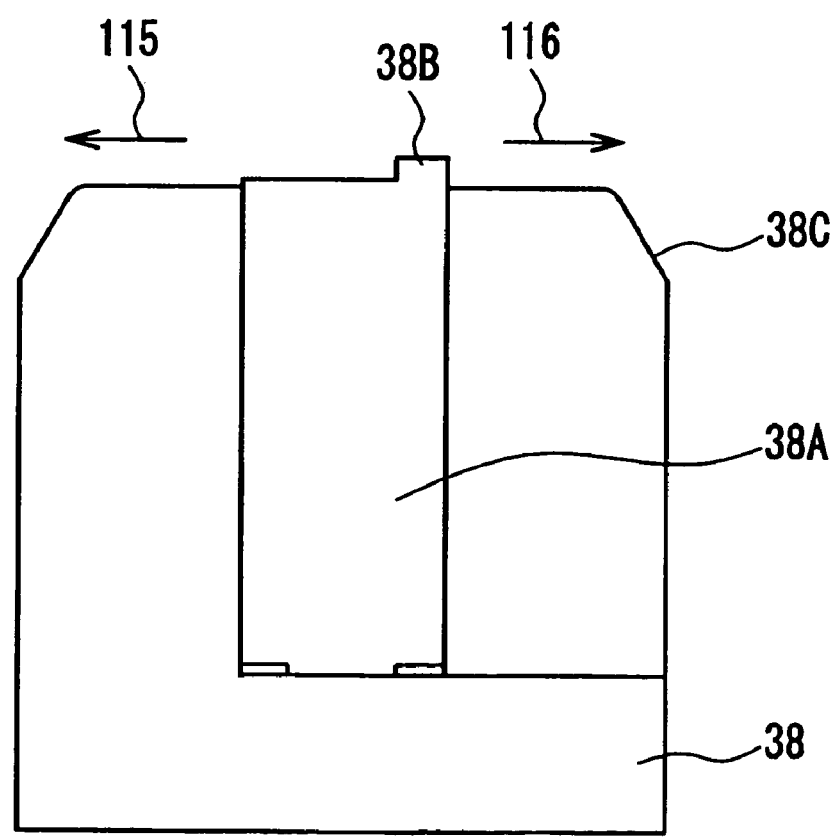
FIG. 4B shows a plan view of the second disk cartridge used in the disk drive according to the embodiment 1.

Similarly, a description is made of the disk cartridge used in the second optical disk media 1B with reference to FIGS. 4A and 4B. FIG. 4A is its perspective view and FIG. 4B is its plan view. Referring to FIGS. 4A and 4B, reference numeral 38 designates a second disk cartridge, and reference numeral 38A designates a cartridge shutter which discloses/closes the contained disk by opening and closing. When the cartridge shutter 38A is moved in the direction of an arrow 115 or 116 by applying force to a shutter projection 38B, the contained disk is exposed, and when the force is cancelled, it returns to an original position by restoring force of a spring member and the like (not shown) and the disk is closed.

In addition, it is assumed that on the disk which is not housed in the disk cartridge, that is, the bare disk which can be used in this embodiment, the recording or reproducing operation can be performed by the second optical head 3B like as the second optical disk media 1B.

Figure 5:
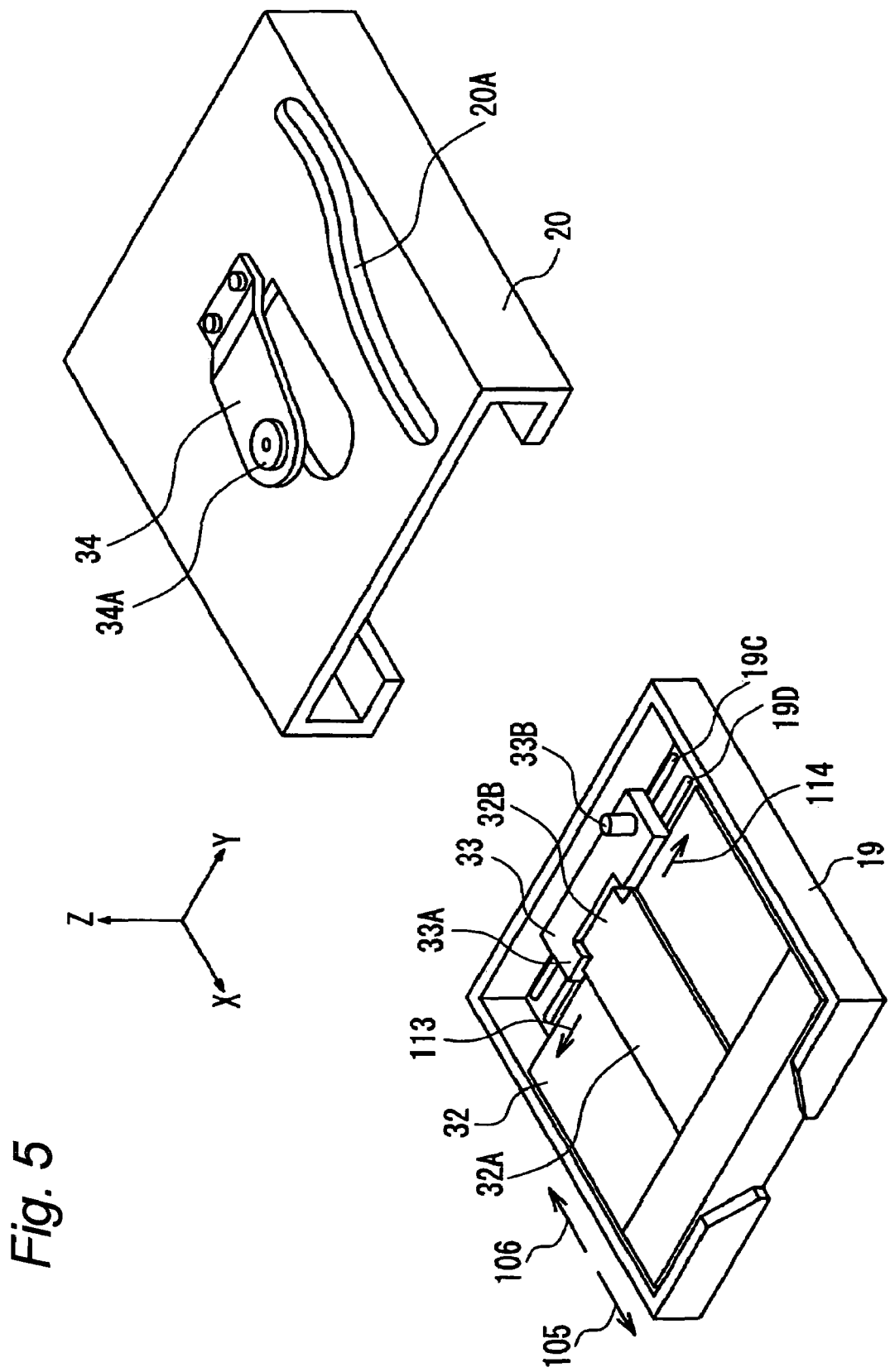
FIG. 5 is an exploded perspective view showing a constitution of a cartridge shutter opening/closing mechanism of a disk cartridge in the disk drive according to the embodiment 1.

FIG. 5 is an exploded perspective view showing a schematic constitution of an example of a mechanism for opening or closing the cartridge shutters 32A and 38B provided in the first and second disk cartridges 32 and 38. Although FIG. 5 shows a case where the first disk cartridge 32 is mounted, the second disk cartridge 38 can be also mounted, and the same operation is performed in both cases. Reference numeral 33 designates a shutter opener which is guided in the direction of the arrow 113 or 114 by guide grooves 19C and 19D provided on the media tray 19 in the Y-axis direction. When the disk cartridge 32 (or 38) is mounted on the media tray 19, the shutter projection 32B (or 38B) engages with a shutter opener projection 33A. When the media tray 19 constituted as described above is assembled into the first tray guide 20, a shutter cam projection 33B provided on an upper surface of the shutter opener 33 engages with a shutter cam groove 20A provided in the first tray guide 20. As the media tray 19 is moved with respect to the tray guide 20 in the X-axis direction (direction of the arrow 105 or 106), the shutter opener 33 is moved with respect to the media tray 19 in the Y-axis direction (direction of the arrow 113 or 114). Thus, the shutter 32A (or 38A) is opened or closed to disclose/close the contained disk.

Figure 6:
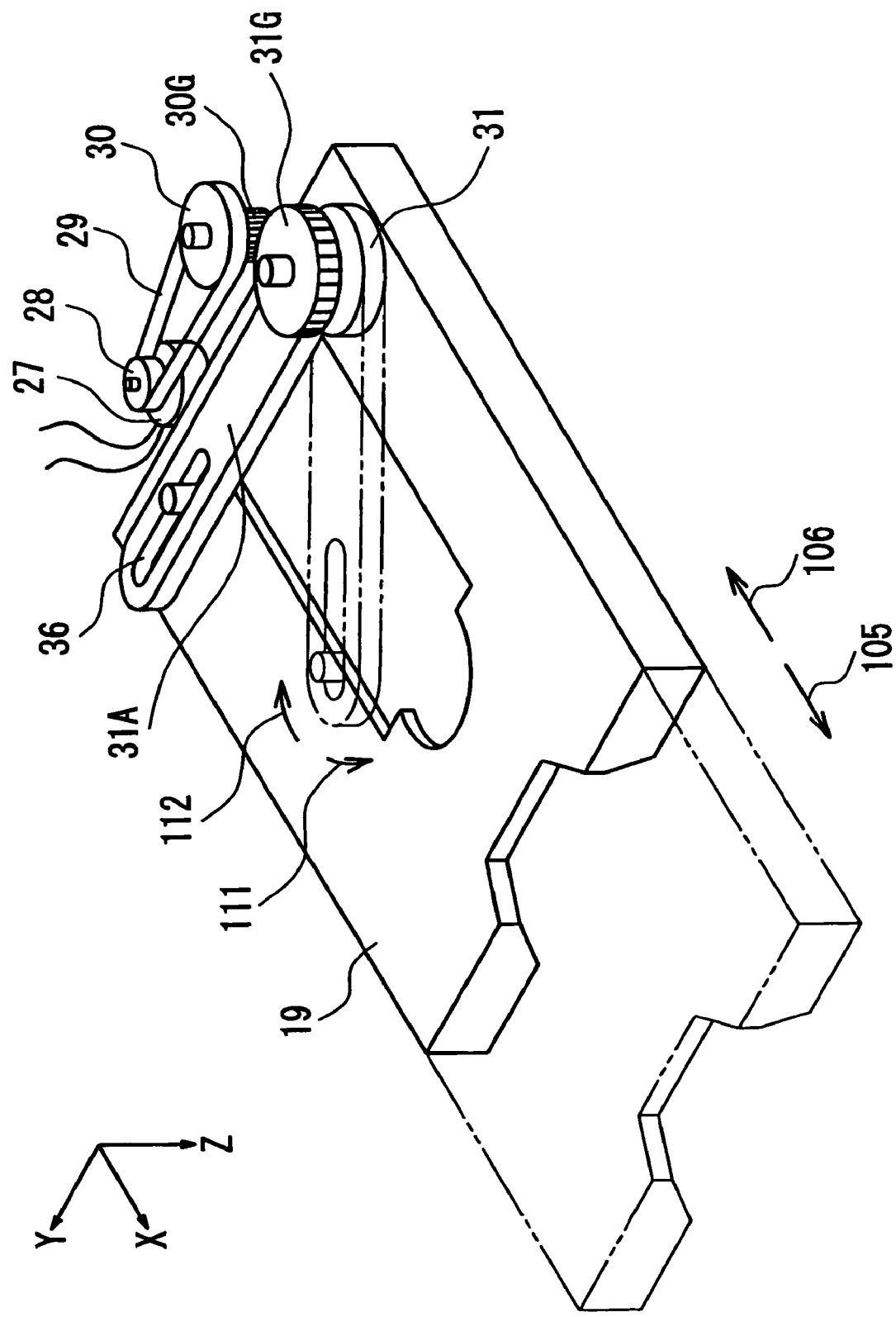
FIG. 6 is a perspective view showing a first disk tray conveying mechanism of the disk drive according to the embodiment 1.

A description is made of operations in which the media tray 19 is guided by the tray guide 20 to be conveyed in the X-axis direction (direction of the arrow 105 or 106) with reference to FIG. 6. FIG. 6 is a perspective view showing a back surface of the media tray 19 shown in FIG. 1. Reference numeral 27 designates a first conveyance driving motor which is a driving source for conveying the media tray 19 and fixed to the first tray guide 20. Reference numeral 30 designates a first conveyance large pulley, and reference numeral 31 designates a first conveyance driving arm, and they are rotatably supported by the first tray guide 20. Driving force of the first conveyance driving motor 27 is transmitted from a first conveyance driving motor pulley 28 mounted on its shaft to the first conveyance large pulley 30 through a first conveyance belt 29, and transmitted to a first conveyance driving arm gear part 31G which is integrally provided with the first conveyance driving arm 31, by a first conveyance large pulley gear part 30G which is integrally provided with the first conveyance large pulley 30. Thus, a first arm part 31A of the first conveyance driving arm 31 is turned in the direction of an arrow 111 or 112 by obtained torque. Thereby, the media tray 19 is conveyed in the direction of the arrow 105 or 106 through a first connection part 36.

Figure 7:
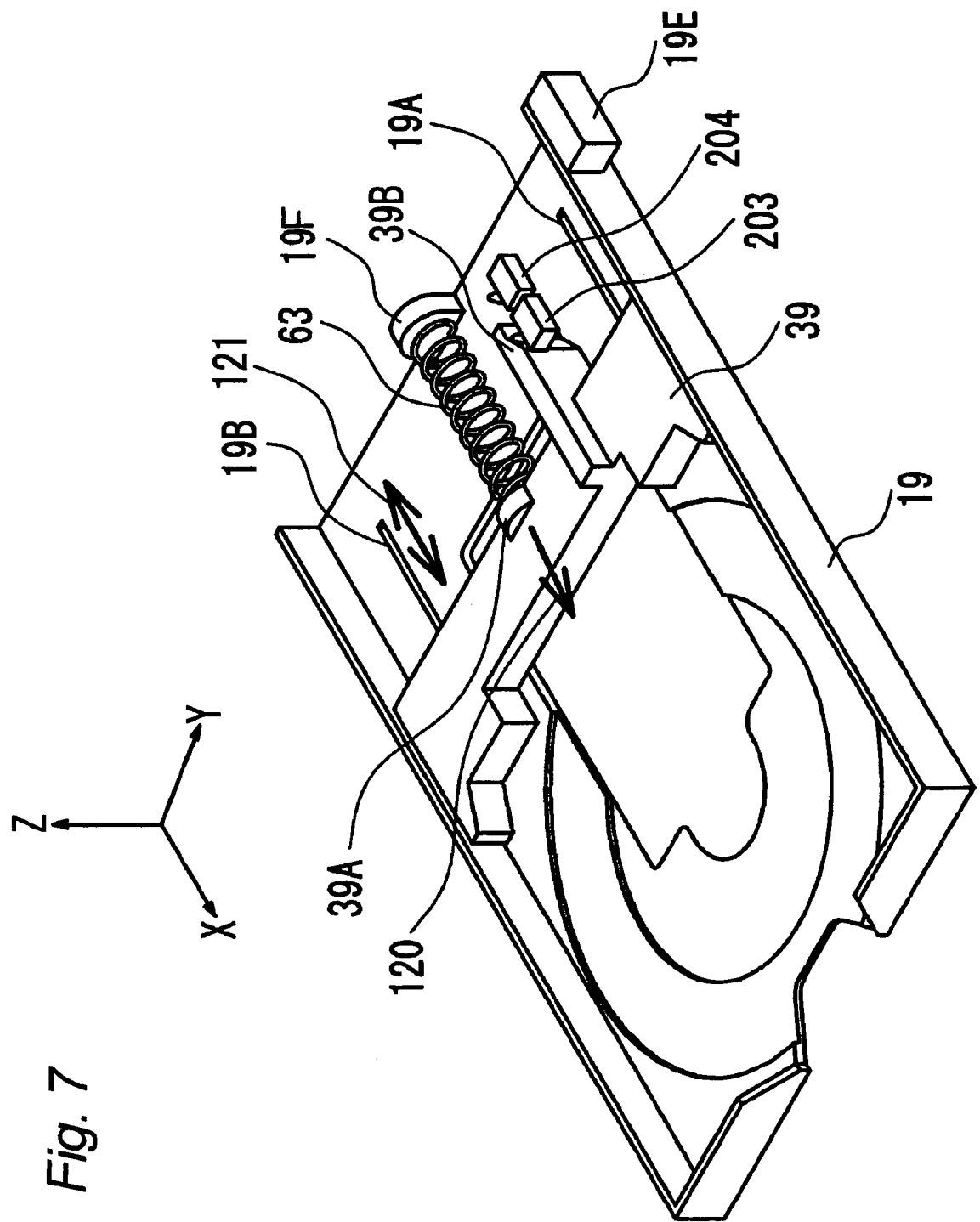
FIG. 7 is a perspective view showing a constitution of a mechanism for distinguishing the kind of the disk set on a media tray in the disk drive according to the embodiment 1.
Figure 8:
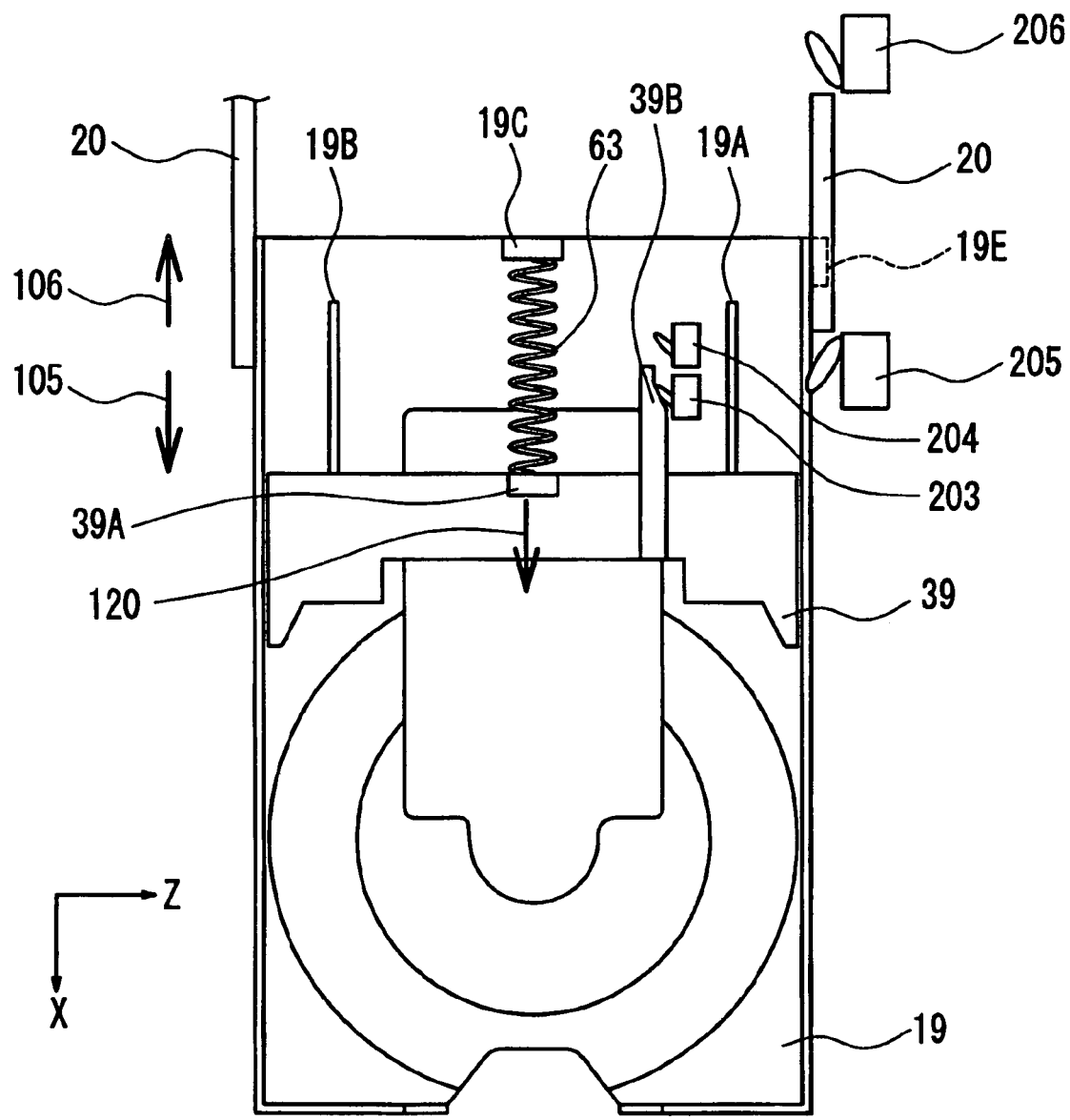
FIG. 8 is a plan view showing the constitution of the mechanism for distinguishing the kind of the disk set on the media tray in the disk drive according to the embodiment 1.

FIG. 7 is a perspective view showing a constitution of the media tray 19 for holding the first disk cartridge 32 or the second disk cartridge 38. In addition, FIG. 8 is a plan view showing the constitution of the media tray 19 which holds the first disk cartridge 32 or the second disk cartridge 38 and a state in which the media tray 19 is guided by the first tray guide 20. In FIGS. 7 and 8, the mechanism for opening the cartridge shutter provided in the disk cartridge shown in FIG. 5 is not shown for simplification. Referring to FIGS. 7 and 8, reference numeral 39 designates a tray slider for holding the disk cartridge when the first disk cartridge 32 or the second disk cartridge 38 is mounted on the media tray 19, and reference numeral 63 designates a slider spring for applying an urging force to the tray slider 39 in a direction of an arrow 120. By guide ribs (not shown) provided on its back surface so as to be guided by guide grooves 19A and 19B provided in the media tray 19 parallel to the X-axis direction, the tray slider 39 is held so as to be movable parallel to the direction of an arrow 121 which is parallel to the X-axis direction. The slider spring 63 is sandwiched and held by a tray spring seat 19C provided at the media tray 19 and by a slider spring seat 39A provided at the tray slider 39. Reference numerals 203 and 204 designate a first slider detection switch and a second slider detection switch, respectively which sequentially detect position of the slider 39 according to its travel distance, and reference numeral 39B designates a slider switch operating projection for operating those switches.

Referring to FIG. 8, reference numerals 205 and 206 designate a discharge end detection switch and an insertion end detection switch provided at the first tray guide 20, respectively which detect that the media tray 19 has reached the end in the respective directions when the media tray 19 is conveyed in the directions of the arrows 105 and 106 by the mechanism shown in FIG. 6. In addition, referring to FIGS. 7 and 8, reference numeral 19E designates a tray switch operating projection provided at the media tray 19, which operates the discharge end detection switch 205 and the insertion end detection switch 206. The position of the media tray 19 is detected by the above detection device.

Figure 9:
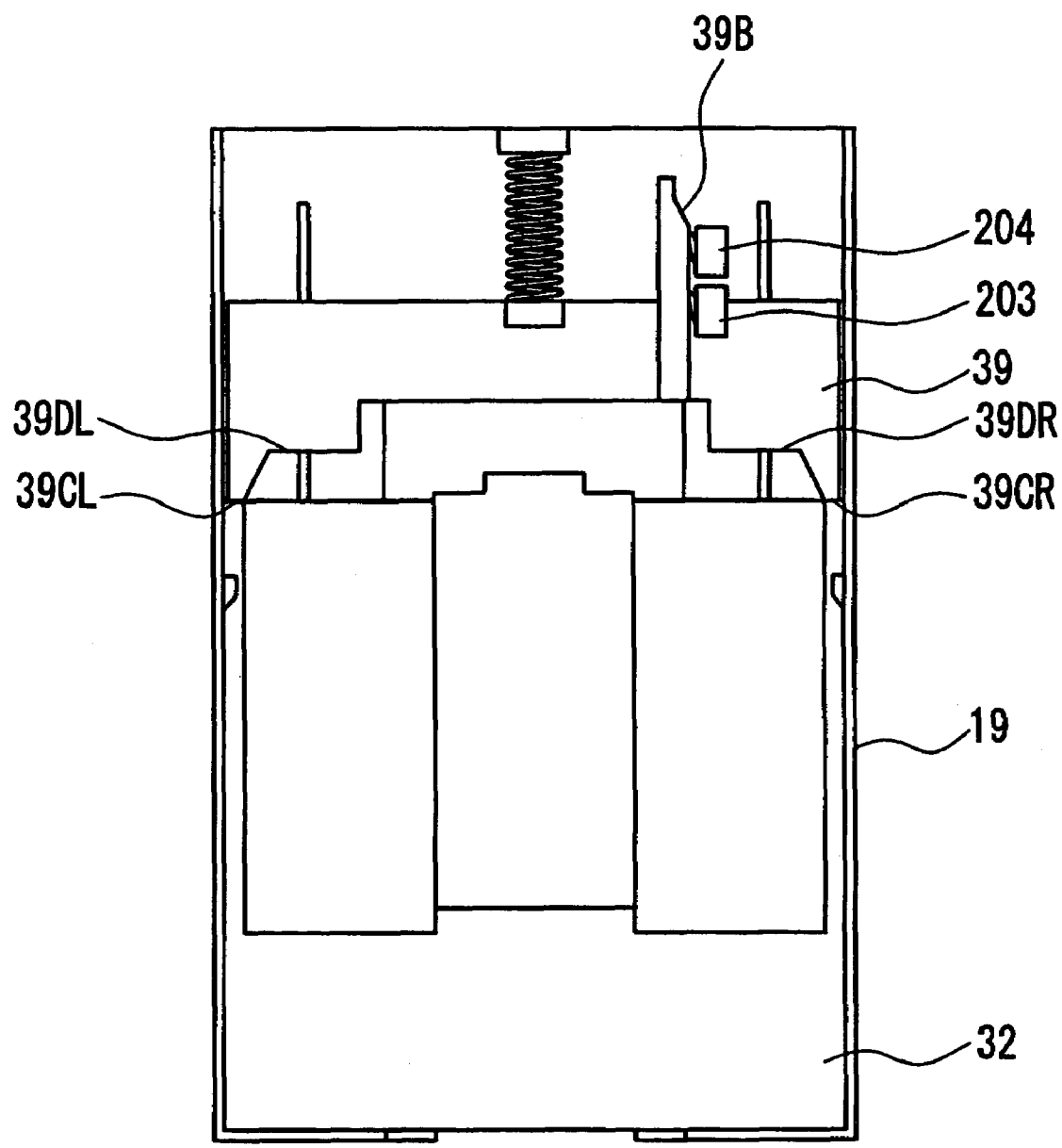
FIG. 9 is a plan view showing a state in which a first disk cartridge is set on the media tray in the disk drive according to the embodiment 1.
Figure 10:
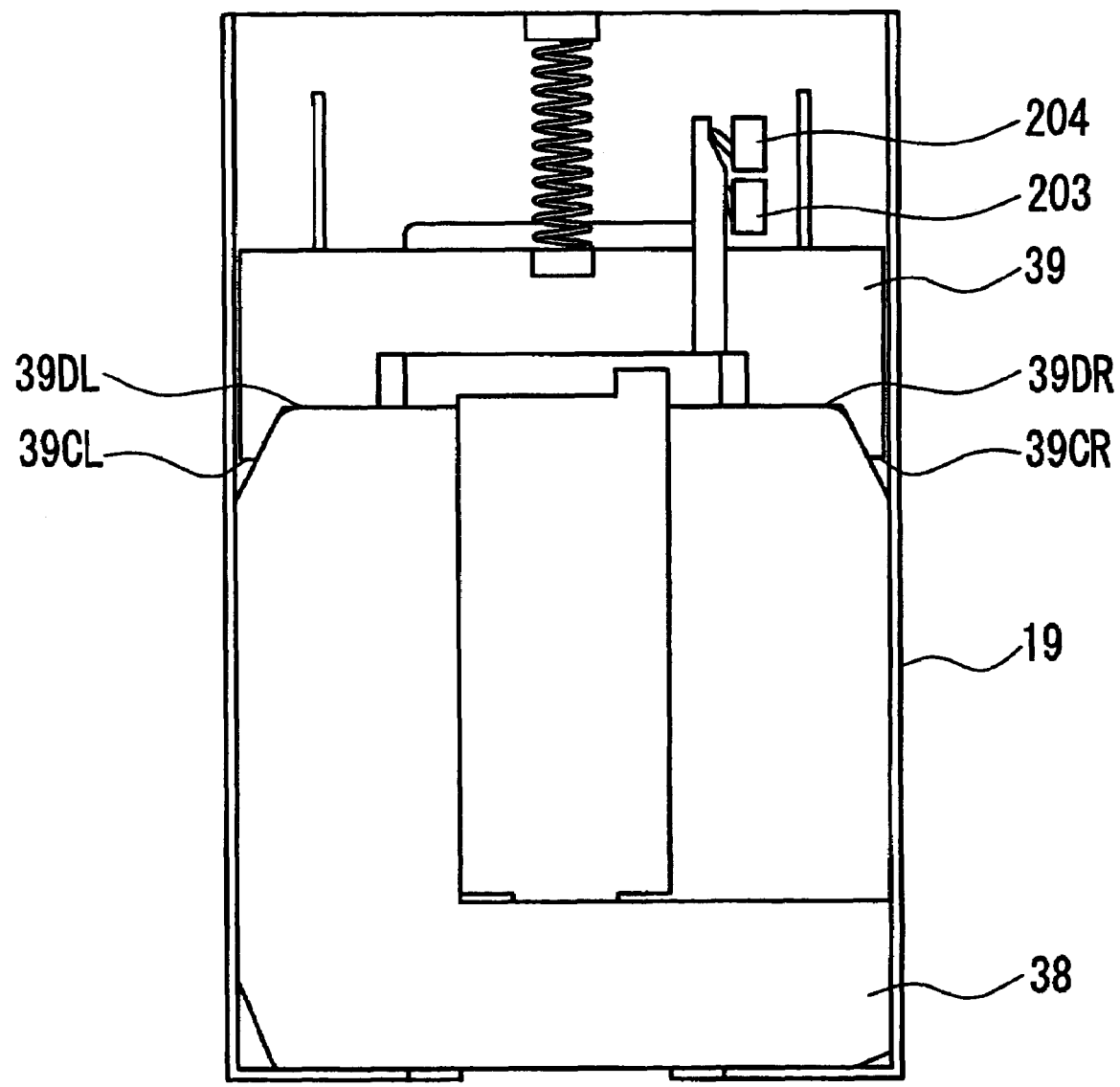
FIG. 10 is a plan view showing a state in which a second disk cartridge is set on the media tray in the disk drive according to the embodiment 1.
Figure 11:
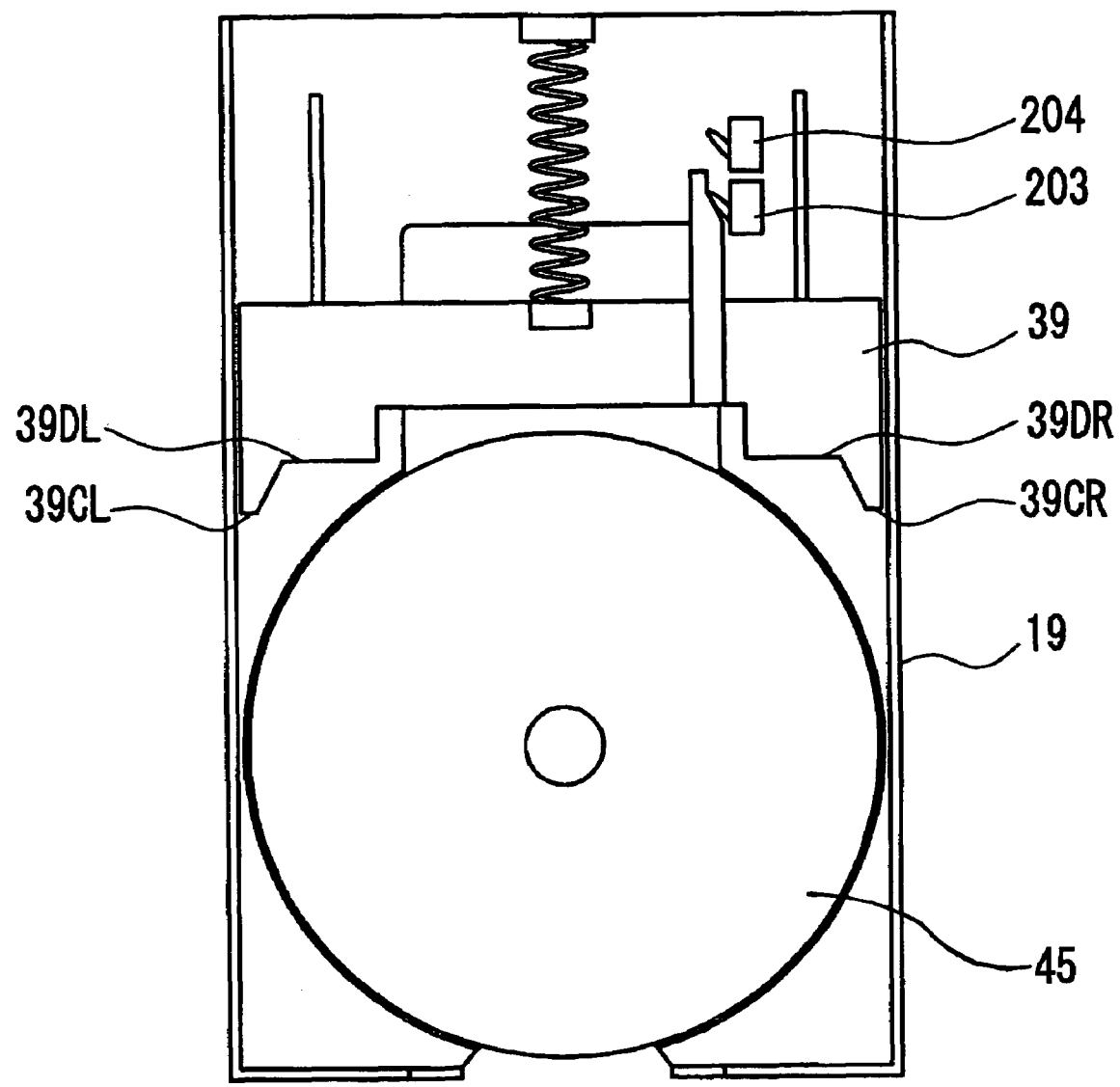
FIG. 11 is a plan view showing a state in which a bare disk is set on the media tray in the disk drive according to the embodiment 1.

Here, a description is made of an behavior of tray slider 39 when the first disk cartridge 32, the second disk cartridge 38 or the bare disk is set on the media tray 19, with reference to FIGS. 9, 10 and 11. FIG. 9 is a plan view showing a state in which the first disk cartridge 32 is set on the media tray 19, FIG. 10 is a plan view showing a state in which the second disk cartridge 38 is set on the media tray 19, and FIG. 11 is a plan view showing a state in which the bare disk 45 is set on the media tray 19. Referring to FIGS. 9, 10 and 11, reference numerals 39CR and 39CL designate a first right urging portion and a first left urging portion, respectively provided on both sides of the tray slider 39 so as to touch an outer shape of the first disk cartridge 32 when it is set. And, reference numerals 39DR and 39DL designate a second right urging portion and a second left urging portion, respectively provided on both sides of the tray slider 39 so as to touch an outer shape of the second disk cartridge 38 when it is set. Referring to FIG. 11, reference numeral 45 designates a disk which is not housed in the disk cartridge when a recording or reproducing operation is performed, that is, the bare disk.

As shown in FIG. 9, when the first disk cartridge 32 is set on the media tray 19, the first disk cartridge 32 comes into contact with the first right urging portion 39CR and the first left urging portion 39CL but it does not come into contact with the second right urging portion 39DR nor the second left urging portion 39DL. Therefore, the first disk cartridge 32 moves the tray slider 39 until the position where the slider switch operating projection 39B turns ON both first slider detection switch 203 and second slider detection switch 204. In addition, in this case, the media detection sensor 210 shown in FIG. 2 becomes ON.

As shown in FIG. 10, when the second disk cartridge 38 is set on the media tray 19, the second disk cartridge 38 does not come into contact with the first right urging portion 39CR and the first left urging portion 39CL but it comes into contact with the second right urging portion 39DR and the second left urging portion 39DL. Therefore, the second disk cartridge 38 moves the tray slider 39 until the position where the slider switch operating projection 39B turns ON the first slider detection switch 203 while keeps OFF the second slider detection switch 204. In addition, in this case, the media detection sensor 210 shown in FIG. 2 becomes ON.

As shown in FIG. 11, when the bare disk 45 is set on the media tray 19, the bare disk 45 does not come into contact with the first right urging portion 39CR nor the first left urging portion 39CL and also it does not come into contact with the second right urging portion 39DR nor the second left urging portion 39DL. Therefore, the position of the tray slide 39 is not changed and both the first slider detection switch 203 and the second slider detection switch 204 are kept OFF. However, in this case, the media detection sensor 210 shown in FIG. 2 also becomes ON.

When any of the first disk cartridge 32, the second disk cartridge 38, and the bare disk is not set on the media tray 19, the position of the tray slide 39 is not changed and both the first slider detection switch 203 and the second slider detection switch 204 are kept OFF. And, in this case, the media detection sensor 210 shown in FIG. 2 becomes OFF.

Thus, an existence of the media and its kind on the media tray 19 can be determined (or distinguished) depending on the operating states of the first slider detection switch 203, the second slider detection switch 204 and the media detection sensor 210.

Even in a case of optical disk media having almost the same outer shape but using different optical systems when the recording and/or reproducing operation is performed, the kind of the optical disk media can be distinguished by containing them in cartridges having different outer shapes.

When there is a case which does not belong to any one of the above-mentioned cases, since it does not occur in the normal state, it is determined that malfunction has been detected.

The operating states of the first slider switch 203, the second slider switch 204 and the media detection sensor 210, and results of determination of the existence and the kind of the media set on the media tray 19 are collectively shown in a table 1.

TABLE 1

| First slider detection switch 203 | Second slider detection switch 204 | Media detection sensor 210 | Media determination result | Media on media tray 19 |
|---|---|---|---|---|
| ON | ON | ON | CTG1 | First disk cartridge |
|  |  | OFF | Malfunction detection |  |
|  | OFF | ON | CTG2 | Second disk cartridge |
|  |  | OFF | Malfunction detection |  |
| OFF | ON | ON | Malfunction detection |  |
|  |  | OFF | Malfunction detection |  |
|  | OFF | ON | BARE | Bare disk |
|  |  | OFF | NO | No media |

Figure 12:
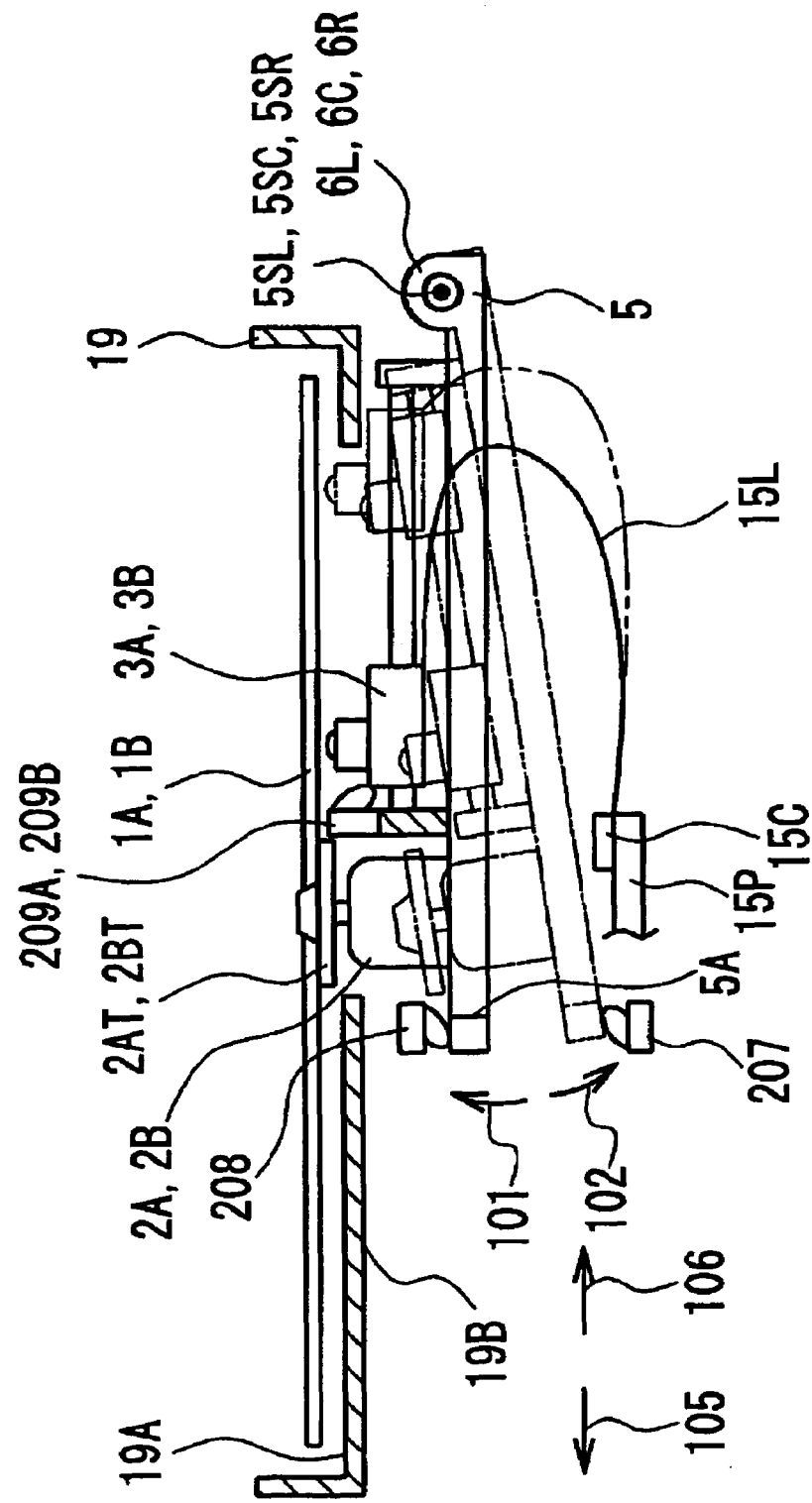
FIG. 12 is a side view showing an elevating operation of a transport base in the disk drive according to the embodiment 1.

A description is made of operations of setting the first optical disk media 1A (or the second optical disk media 1B) on the first disk motor 2A (or the second disk motor 2B) with reference to FIG. 12. However, the following operational procedures are one example, operation does not always start from the following starting point. First, as shown by two-dot chain line in FIG. 12, the transport base 5 is turned in the direction of the arrow 102 around the turn spindles 5SL, 5SC and 5SR, so that while a first turntable 2AT (or a second turntable 2BT) mounted on a main shaft of the first disk motor 2A (or the second disk motor 2B) is in a lowered state, the first optical disk media 1A (or the second optical disk media 1B) is conveyed to the position over the first disk motor 2A (or the second disk motor 2B) in the direction of the arrow 106 in a state in which it is set on the media tray 19. Then, when the transport base 5 is turned around the turn spindles 5SL, 5SC and 5SR in the direction of the arrow 101, the first turntable 2AT (or the second turn table 2BT) is inserted into a central hole of the first optical disk media 1A (or the second optical disk media 1B) as shown by a solid line in such a manner that it is thrust from beneath and then the setting is completed. The turned amount of the transport base 5 is set such that in the state the first turntable 2AT (or the second turntable 2BT) is lowered, the first turntable 2AT (or the second turntable 2BT) and the first optical head 3A (or the second optical head 3B) are lower than a lower surface 19B of the media tray 19 shown in FIG. 12 so as not to interfere with the media tray 19 and the first tray guide 20 when the tray guide 19 is conveyed in the X-axis direction (direction of the arrow 105 or 106), or when it is conveyed with the first tray guide 20 in the Y-axis direction (the direction of the arrow 107 or 108).

In addition, it is necessary to increase the turn amount of the transport base 5, in order to avoid the above interference even when the first optical head 3A (or the second optical head 3B) is not conveyed to the most inner circumference position of the first optical disk media 1A (or the second optical disk media 1B) in the radius direction, which is set on the turn table 2AT (or 2BT) attached to the first disk motor 2A (or the second disk motor 2B). According to this embodiment, in order to reduce a height dimension of the device, the first optical head 3A (or the second optical head 3B) is to be surely moved to the most inner circumference side before the media tray 19 is moved in the X-axis direction and the Y-axis direction so as to reduce the turn amount of the transport base 5 as much as possible.

A first inner circumference detection switch 209A (or a second inner circumference detection switch 209B) is provided on the transport base 5 so as to confirm that the optical head 3A (or the second optical head 3B) is surely conveyed to the most circumference position of the first optical disk media 1A (or the second optical disk media 1B) in the radius direction which is set on the turntable 2AT (or 2BT) attached to the first disk motor 2A (or the second disk motor 2B).

Referring to FIG. 12, reference numeral 207 designates a lowered end detection switch for detecting the finished end when the transport base 5 is turned in the direction of the arrow 102, and reference numeral 208 designates a lifted end detection switch for detecting the finished end when the transport base 5 is turned in the direction of the arrow 101, which are operated by a elevating switch detecting projection 5A provided on the transport base 5. The lifted or lowered state of the transport base 5 is determined by the above detection device.

When the first optical disk media 1A (or the second optical disk media 1B) set on the media tray 19 is fixed and held on the first disk motor 2A (or the second disk motor 2B), a clamper unit 34 is lowered by a driving system (not shown) and a clamper 34A provided in the clamper unit 34 is urged or adsorbed to the first turntable 2AT (or the second turntable 2BT) so that the optical disk media 1A (or the second optical disk media 1B) is sandwiched and held between the first turntable 2AT (or the second turntable 2BT) and the clamper 34A. The lowering operation of the clamper unit 34 may be performed with at least one of the operation in which the media tray 19 is moved in the direction of the arrow 106 to be inserted into the first tray guide 20, the operation in which the first tray guide 20 is conveyed in the direction of the arrow 107 or 108, and the operation in which the transport base 5 is lifted. In addition, as a mechanism for generating a force for urging or adsorbing the clamper 34A to the first turntable 2AT (or the second turntable 2BT), a publicly known method such as magnetic force or spring force can be used, although it is not shown.

Referring to FIG. 12, reference numeral 15P designates a print substrate for electrically controlling the first optical head 3A (or the second optical head 3B), reference numeral 15L designates a flexible cable (FPC or FFC and the like, for example) for connecting the print substrate 15P to the first optical head 3A (or the second optical head 3B), and reference numeral 15C designates a connector serving as a connection part between them. Even when the first optical head 3A (or the second optical head 3B) is transported between a proximal side and distal side with respect to the first disk motor 2A (or the second disk motor 2B), as shown in FIG. 12, the flexible cable 15L can follow the movement of the first optical head 3A (or the second optical head 3B) in an unburdened curved state.

According to the disk drive of this embodiment of the present invention, a wavelength of a light source and/or lens specifications and the like of the first optical head 3A may be different from those of the second optical head 3B. As the wavelength of the light source, an infrared wavelength of 750 to 800 nm, a red-light wavelength of 600 to 700 nm, a blue-light wavelength of 400 to 450 nm and the like are used. In addition, as numerical apertures which is one of the specifications for the lens, numerical apertures of 0.4 to 0.9 can be used.

According to the present invention, since an amount of time required from the insertion of the optical disk media until the recording and/or reproducing operation depends on the kind of the head, when the two optical heads 3A and 3B have different specifications, it is preferable to select the optical head which is used more often, as the first optical head 3A in order to shorten the required time.

In the disk drive according to this embodiment of the present invention, the first region in which the first disk motor 2A and the first optical head 3A are mounted and the second region in which the second disk motor 2B and the second optical head 3B are mounted are integrally constituted in the transport base 5. However, both regions can be separated from each other by a separating line 38 shown in FIG. 1, for example, and each of them can be separately lowered or lifted, to differentiate the heights of the surface of the first disk motor 2A and the second disk motor 2B on which the disks are set during the recording/reproducing operation, for a reason that the height of the first optical head 3A and the height of the second optical head 3B are different from each other and the like. In addition, in order to reduce the load to the elevating motor 10, or to avoid the interference with the media tray 19 or the first tray guide 20 to use space effectively, the divided transport bases 5 may be lifted or lowered at different timing.

Figure 13:
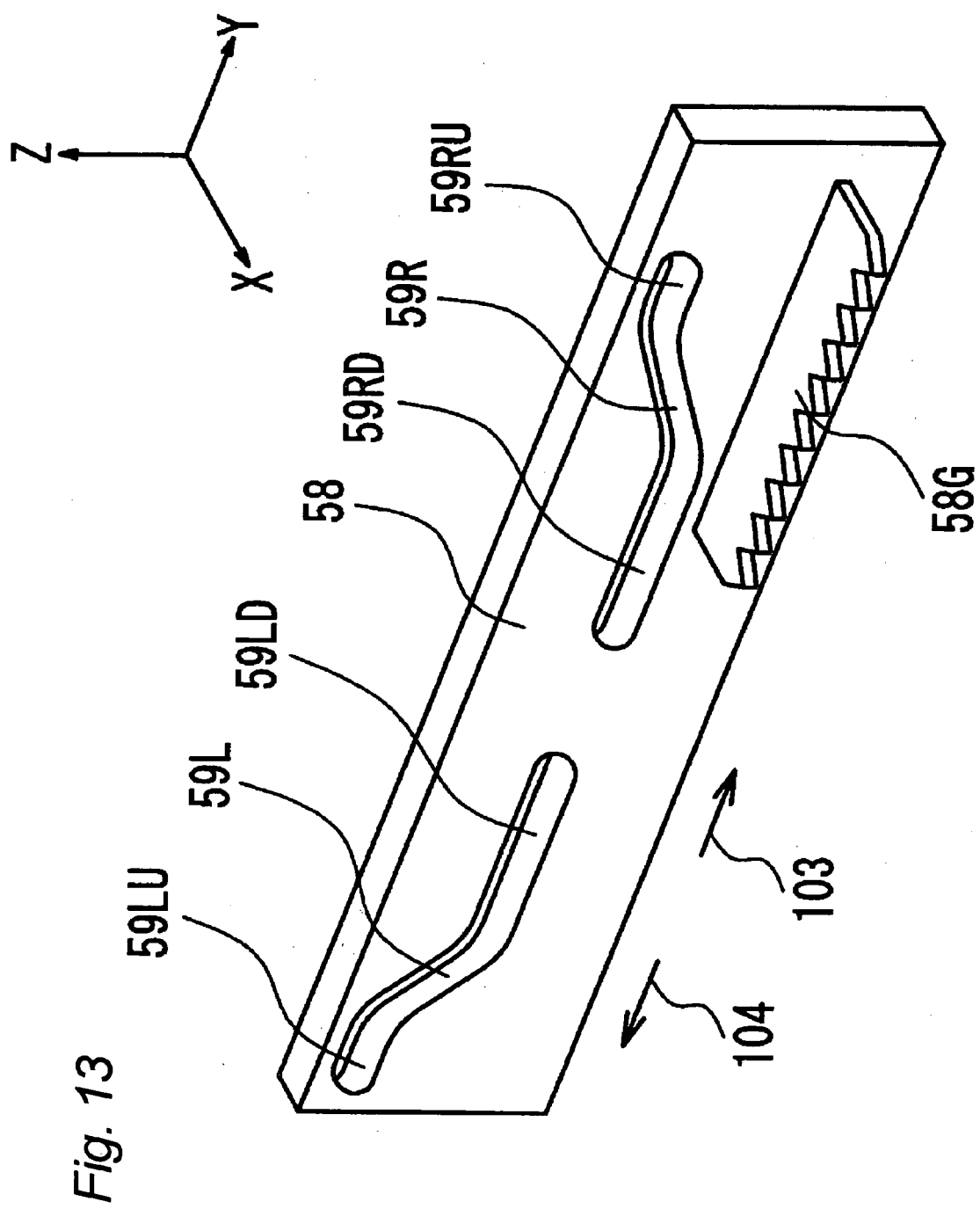
FIG. 13 is a perspective view showing another constitution example of a slide cam for elevating the transport base in the disk drive according to the embodiment 1.

For example, a slide cam 58 shown in FIG. 13 can be used instead of the previously explained slide cam 8. When this slide cam 58 is used, the first and second regions can be separately lifted or lowered by rotating the elevating motor 10 in the opposite direction to each other.

More specifically, when the slide cam 58 is moved in the direction of the arrow 103, the support pin 7L shown in FIG. 1 reaches an upper part 59LU of a cam groove 59L, and the support pin 7R reaches a lower part 59RD of a cam groove 59R. Therefore, at this time, the first region is lowered and the second region is lifted.

On the other hand, when the slide cam 58 is moved in the direction of the arrow 104, the support pin 7L shown in FIG. 1 reaches a lower part 59LD of a cam groove 59L, and the support pin 7R reaches an upper part 59RU of a cam groove 59R. Therefore, at this time, the first region is lifted and the second region is lowered.

Thus, the first region and the second region can be separately lifted or lowered.

Figure 14:
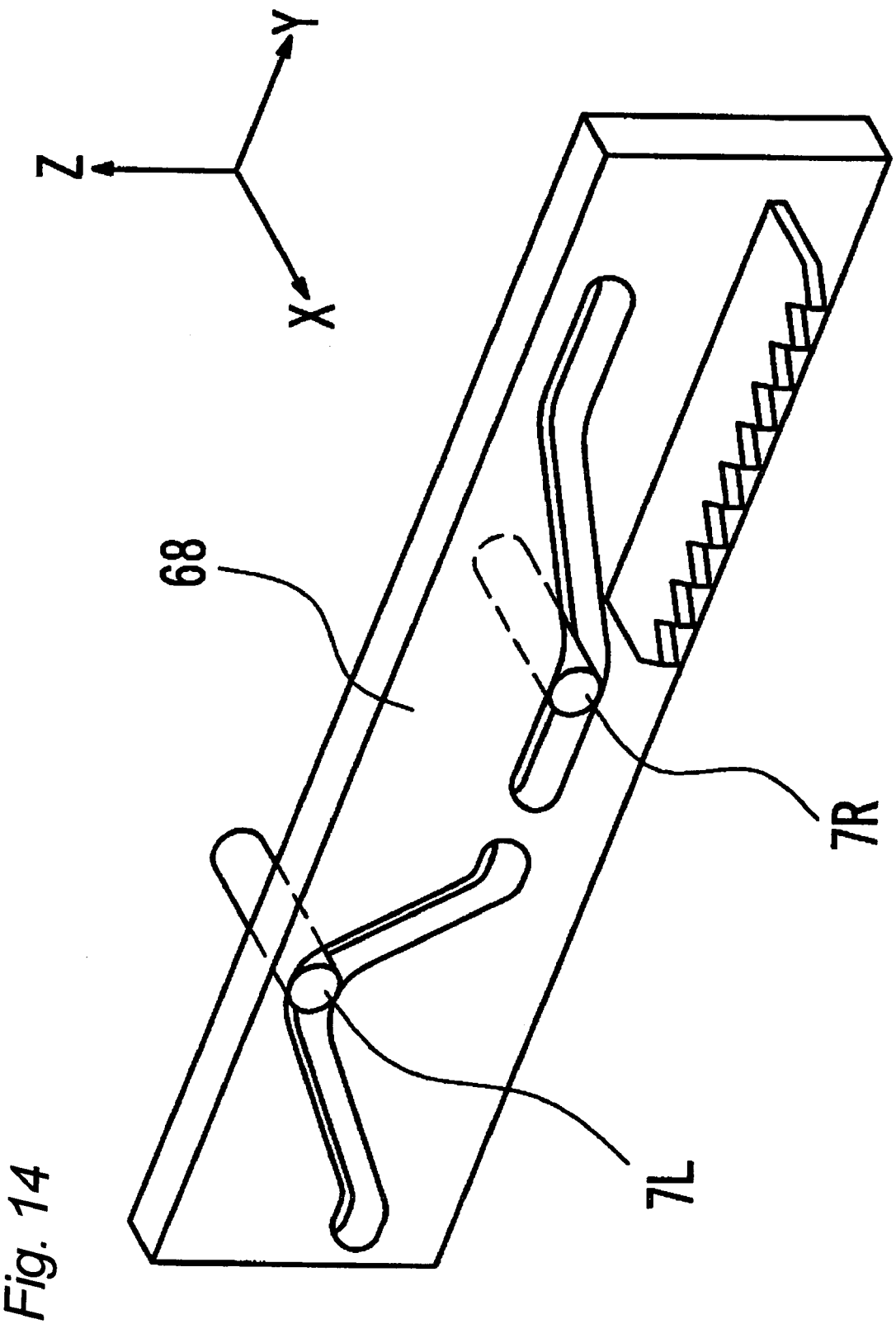
FIG. 14 is a perspective view showing still another constitution example of a slide cam for elevating the transport base in the disk drive according to the embodiment 1 invention.

In addition, the first region and the second region can be separately lifted or lowered by rotating the elevating motor 10 in the same direction. In order to implement this, a slide cam 68 shown in FIG. 14, for example may be used instead of the slide cam 8 shown in FIG. 1. One transport base is lifted and the other is lowered by adjusting a stopped position while the elevating motor 10 is rotated in one direction.

Furthermore, in the disk drive according to this embodiment, the mechanism for opening the cartridge shutter 32A provided at the disk cartridge 32 is not limited to the constitution described above, and the same effect can be obtained even in a case where another publicly known method is used.

According to the disk drive of this embodiment, the driving system in which the media tray 19 is conveyed with respect to the first tray guide 20 in the X-axis direction (direction of the arrow 105 or 106), the driving system in which the first tray guide 20 is conveyed integrally with the media tray 19 along the second tray guides 21F and 21R in the Y-axis direction (direction of the arrow 107 or 108), and the driving system in which the slide cam 8 is conveyed in the Y-axis direction (direction of the arrow 103 or 104) to lift or lower the transport base 5 are each separately constituted. However, when a part of the above driving systems or all of them are shared and the operation of each part is moved in relation with other operations, the number of motors can be reduced and the operations can be sequentially performed, so that malfunction can be prevented.

Figure 15:
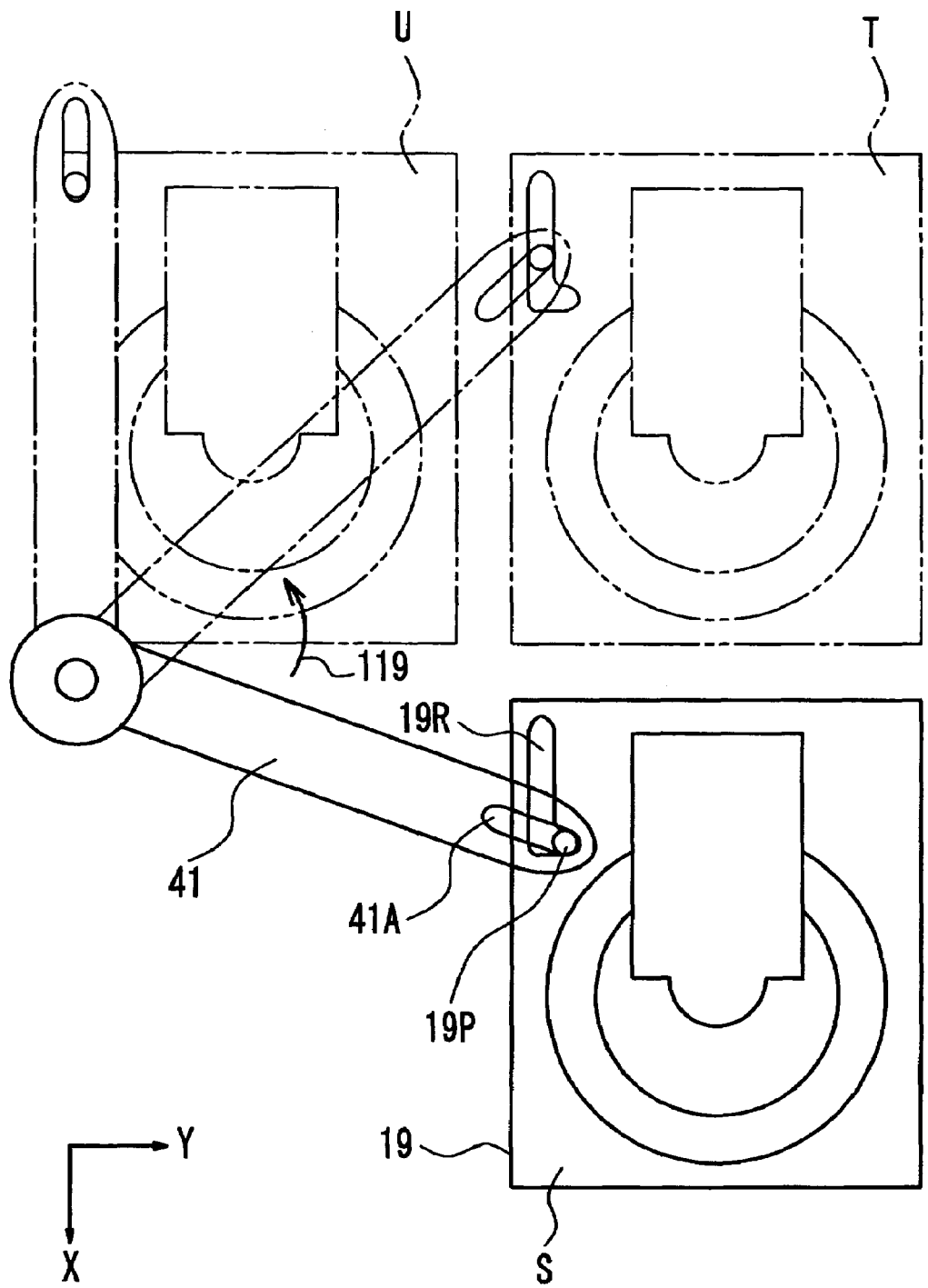
FIG. 15 is a plan view showing another constitution of a disk tray conveying mechanism in the disk drive according to the embodiment 1.

An example of a constitution performing the above operation is shown in FIG. 15. Reference numeral 41 designates a tray arm and a groove 41A is provided in the tray arm 41. In addition, an L-shaped cam groove 19R is provided in the media tray 19 and a pin 19P can be moved along the cam groove 19R. Referring to FIG. 15, in an S position (a third tray position), the media tray 19 is discharged from the device so that the optical disk media can be mounted or dismounted, in a T position (a first tray position), the media tray 19 is inserted from the S position into the device and a recording/reproducing operation can be performed onto the first optical disk media 1A by the first optical head 3A, and in a U position (a second tray position), the media tray 19 is conveyed from the T position in the device and the recording and/or reproducing operation can be performed to the second optical disk media 1B by the second optical head 3B. In the state where the media tray 19 is at the S position, when the tray arm 41 is turned by a driving source (not shown) in the direction of an arrow 119, its driving force is transmitted to the media tray 19 through the groove 41A, the pin 19P and cam groove 19R, and then the media tray 19 is moved to the T position. Then, when the tray arm 41 is further turned in the direction of an arrow 119, the media tray 19 is moved to the U position in the same way.

In addition, in this case also, the tray guide right end detection switch 201, the tray guide left end detection switch 202, the discharge end detection switch 205 and the insertion end detection switch 206 are provided as described above, and it is preferable that the position of the media tray 19 is detected as described above.

According to the disk drive of this embodiment, the optical disk media is taken in and out by moving the media tray 19 along X-axis and by inserting and discharging the media tray 19. The media tray 19 is always moved along X-axis in the first region. In other words, when the optical disk media is set on the media tray 19 which was discharged from the device, the media tray 19 is guided by the first tray guide 20 and moved in the direction of the arrow 106 in FIG. 1 to be housed in the device. At this time, the optical disk media exists on the first disk motor 2A. Even when the optical disk media is the second optical disk media 1B corresponding to the second disk motor 2B and the second optical head 3B, it is conveyed onto the first disk motor 2A along X-axis without fail and then conveyed onto the second disk motor 2B along Y-axis. When the second optical disk media 1B is taken out, the media tray 19 is moved onto the first disk motor 2A along Y-axis and then moved along X-axis to be discharged out of the device. According to this constitution, although an operation time of starting and discharging for the first optical disk media 1A is shortened, the time for the second optical disk media 1B is increased.

The present invention is not limited to the above constitution, and when the media tray 19 is guided by the first tray guide 20 and moved along X-axis, its position in the Y-axis direction can be appropriately varied by appropriately adjusting a phase of a turning start position of the conveyance driving arm 26 especially among the second tray conveyance driving system. For example, when that position is set in the middle point between the rotation center of the first disk motor 2A and the rotation center of the second disk motor 2B, it is effective in the matter of symmetry of the device. In addition, in this case also, the tray guide right end detection switch 201, the tray guide left end detection switch 202, the discharge end detection switch 205 and the insertion end detection switch 206 are provided as described above, and it is preferable that the position of the media tray 19 is detected as described above.

Still further, according to the disk drive of the present invention, although as the motor, the first conveyance driving motor 27, the second conveyance driving motor 22 and the elevating motor 10 are used, as the motor pulley, the first conveyance driving motor pulley 28, the second conveyance driving motor pulley 23 and the elevating motor pulley 11 are used, and as the large pulley, the first conveyance large pulley 30 and the second conveyance large pulley 25 are used, since they are similar in specifications, the number of kinds of parts can be reduced by sharing the specifications depending on working torque or working speed so that rationalization can be promoted.

Hereinafter, a description is made of a method of controlling each operation according to this embodiment.

First, a description is made of points to be checked in performing each operation.

Regarding the operation in which the media tray 19 is guided by the first tray guide 20 and conveyed in the X-direction, it is to be confirmed that the first turntable 2AT (or the second turntable 2BT) is lower than the media tray 19, that is, the transport base 5 is at the lowered position. In other words, it is to be confirmed that the lowered end detection switch 207 is in ON state. Thus, the lower part of the media tray 19 can be prevented from bumping against the first disk motor 1A (or the second disk motor 1B) or the first optical head 3A (or the second optical head 3B).

In addition, it is to be confirmed that the first inner circumference detection switch 209A (and the second inner circumference detection switch 209B) is in ON state. Thus, it can be confirmed that the first optical head 3A (and the second optical head 3B) is surely moved to the most inner circumference side. As a result, as described above, the turn amount of the transport base 5 can be reduced and then the height dimension of the whole device can be reduced. However, when it is not necessary to reduce the turn amount of the transport base 5 because there is no limit in the height dimension of the whole device, the first inner circumference detection switch 209A (and the second inner circumference detection switch 209B) is not necessarily in ON state.

Regarding the operation in which the first tray guide 20 is conveyed integrally with the media tray 19 in the Y-axis direction, similar to the operation in which the media tray 19 is guided by the first tray guide 20 and conveyed in the X-axis direction, it is to be confirmed that the lowered end detection switch 207 is in ON state and that the first inner circumference detection switch 209A (and the second inner circumference detection switch 209B) is in ON state. Thus, the lower part of the media tray 19 is prevented from bumping against the first disk motor 1A (or the second disk motor 1B) or the first optical head 3A (or the second optical head 3B).

However, at this time also, when it is not necessary to reduce the turn amount of the transport base 5 because there is no limit in the height dimension of the whole device, the first inner circumference detection switch 209A (and the second inner circumference detection switch 209B) is not necessarily in ON state.

Furthermore, it is to be confirmed that the insertion end detection switch 206 is in ON state. Thus, since it can be confirmed that the media tray 19 is completely inserted into the tray guide 20, it is prevented that the media tray 19 moves while protrudes from the tray guide 20 and a projecting part thereof bumps against another part, causing a damage of the device.

Regarding the lifting operation of the transport base 5, it is to be confirmed that the insertion end detection switch 206 is ON state, and the right end detection switch 201 or the left end detection switch 202 is ON state. Thus, it can be confirmed that the media tray 19 is surely inserted into the first tray guide 20, and the integral movement of the media tray 19 and the tray guide 20 to the first region or the second region is completed. Thus, the first disk motor 1A (or the second disk motor 1B) or the first optical head 3A (or the second optical head 3B) is prevented from bumping against the lower part of the media tray 19, so that it can be avoided that the device is damaged.

The above points to be confirmed are collectively shown in a table 2.

TABLE 2

| Kind of operation | Switch state to be confirmed before operation |
| --- | --- |
| Conveyance operation of media tray 19 in the X-axis direction | (1) Inner circumference detection switch 209A (209B) is ON<br>(2) Lowered end detection switch 207 is ON |
| Conveyance operation of first tray guide 20 in the Y-axis direction | (1) Inner circumference detection switch 209A (209B) is ON<br>(2) Lowered end detection switch 207 is ON<br>(3) Insertion end detection switch 206 is ON |
| Lifting operation of transport base 5 | (1) Insertion end detection switch 206 is ON<br>(2) Right end detection switch 201 or left end detection switch 202 is ON |
| Lowering operation of transport base 5 | (1) Inner circumference detection switch 209A (209B) is ON |

Operational flows of the disk drive according to this embodiment are described with reference to FIGS. 16 to 18. According to these operational flows, it is assumed that a state in which the media tray 19 is out of the disk drive (a state in which the discharge end detection switch 205 is ON) is a starting state of the operations.

Figure 16:
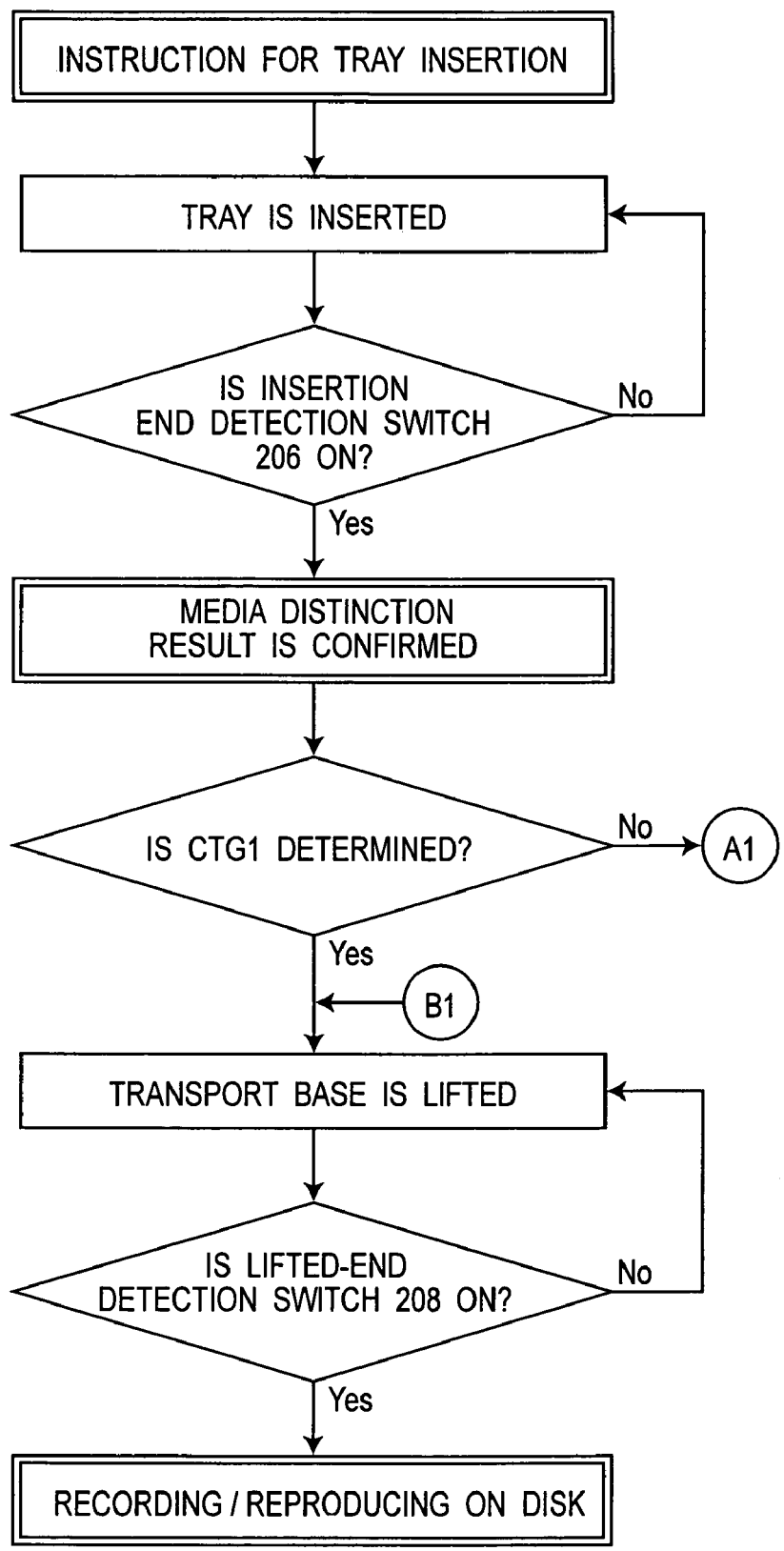
FIG. 16 is a flowchart showing operations of the disk drive according to the embodiment 1.

As shown in FIG. 16, when an instruction for inserting the media tray 19 is generated, the first conveyance driving motor 27 shown in FIG. 6 is rotated in the direction so that the media tray 19 may be conveyed in the direction of the arrow 106. In addition, the instruction for inserting the media tray 19 means a trigger in which a user press an insertion/discharge switch (so called inject switch) or the media tray 19 is pressed by a hand of the user in the direction of the arrow 106 so that the discharge end detection switch 205 becomes OFF, for example. Thus, the first conveyance driving motor 27 is rotated until the insertion end detection switch 206 becomes ON.

When it is detected that the insertion end detection switch 206 becomes ON, the kind of the media set on the media tray 19 is distinguished. According to the table 1, the existence and kind of the media are determined from the detection result of the first slider detection switch 203, the second slider detection switch 204 and the media detection sensor 210. In addition, as shown in the table 1, when it is detected that the first slider detection switch 203 is OFF and the second slider detection switch 204 is ON, since that result does not occur in the normal state, it is determined that something is wrong in insertion or the like and an operation for it is performed separately.

When the kind of the media is determined as CTG1 according to the table 1, the elevating motor 10 is rotated without changing the position of the first tray guide 20 in the Y-axis direction, that is, keeping the second conveyance driving motor 22 stopped, and then the transport base 5 is turned in the direction of the arrow 101 shown in FIGS. 1 and 12 to be lifted. When the lifted end detection switch 208 becomes ON, the elevating motor 10 is stopped. Then, the recording or reproducing operation is performed on this disk.

Figure 17:
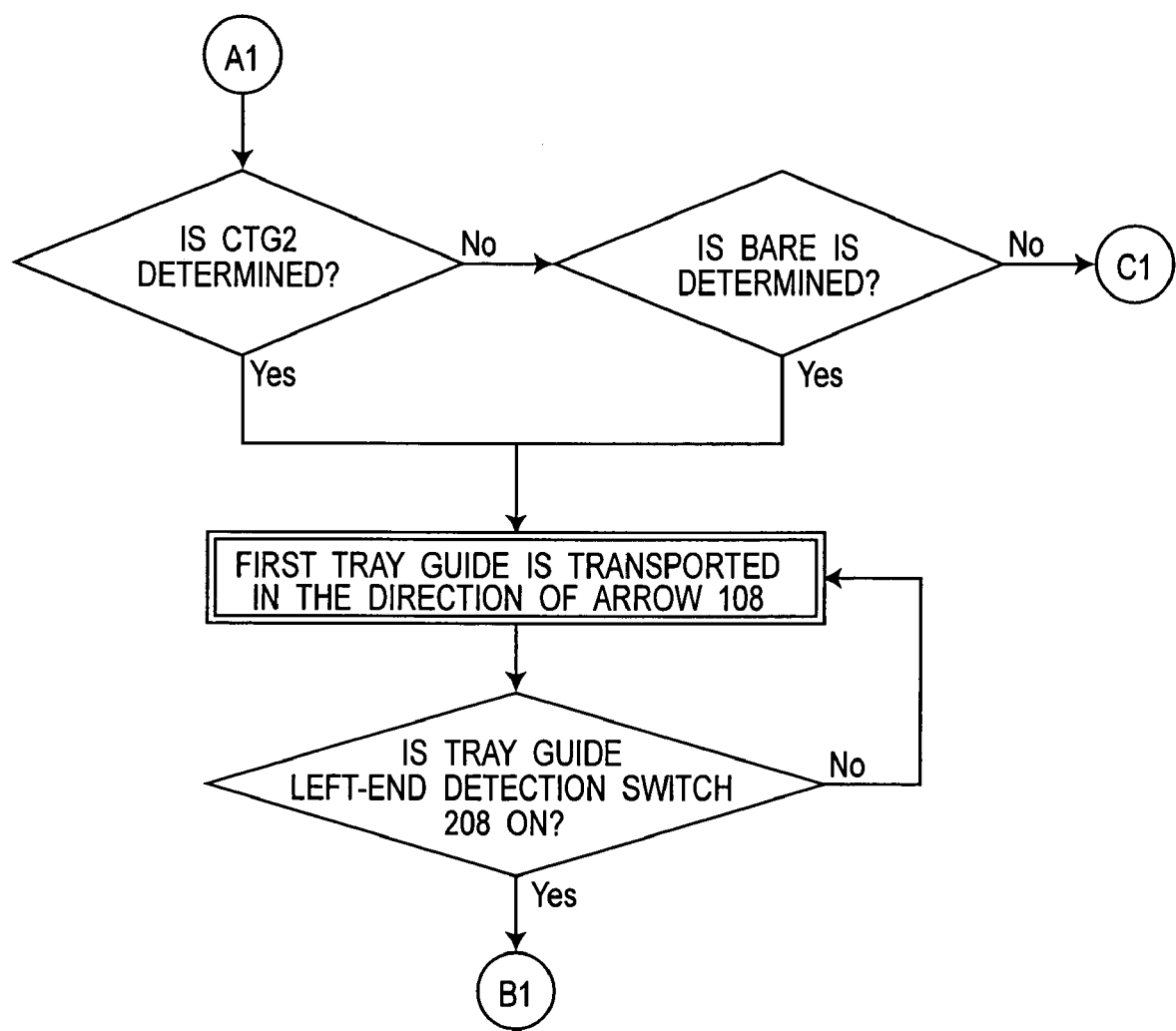
FIG. 17 is a flowchart showing operations of the disk drive according to the embodiment 1.

When the kind of the media is determined as CTG2 according to the table 1, as shown in FIG. 17, the first tray guide 20 is conveyed in the direction of the arrow 108 in FIG. 1 by rotating the second conveyance driving motor 22. When the tray guide left end detection switch 202 becomes ON, the rotation of the second conveyance driving motor 22 is stopped. Then, the transport base 5 is turned in the direction of the arrow 101 in FIGS. 1 and 12 and lifted by rotating the elevating motor 10. When the lifted end detection switch 208 becomes ON, the rotation of the elevating motor 10 is stopped. Then, the recording or reproducing operation is performed on this disk.

When the kind of the media is determined as BARE according to the table 1, the same operation as in the case of CTG2 is performed, and the recording or reproducing operation is performed on this disk.

Figure 18:
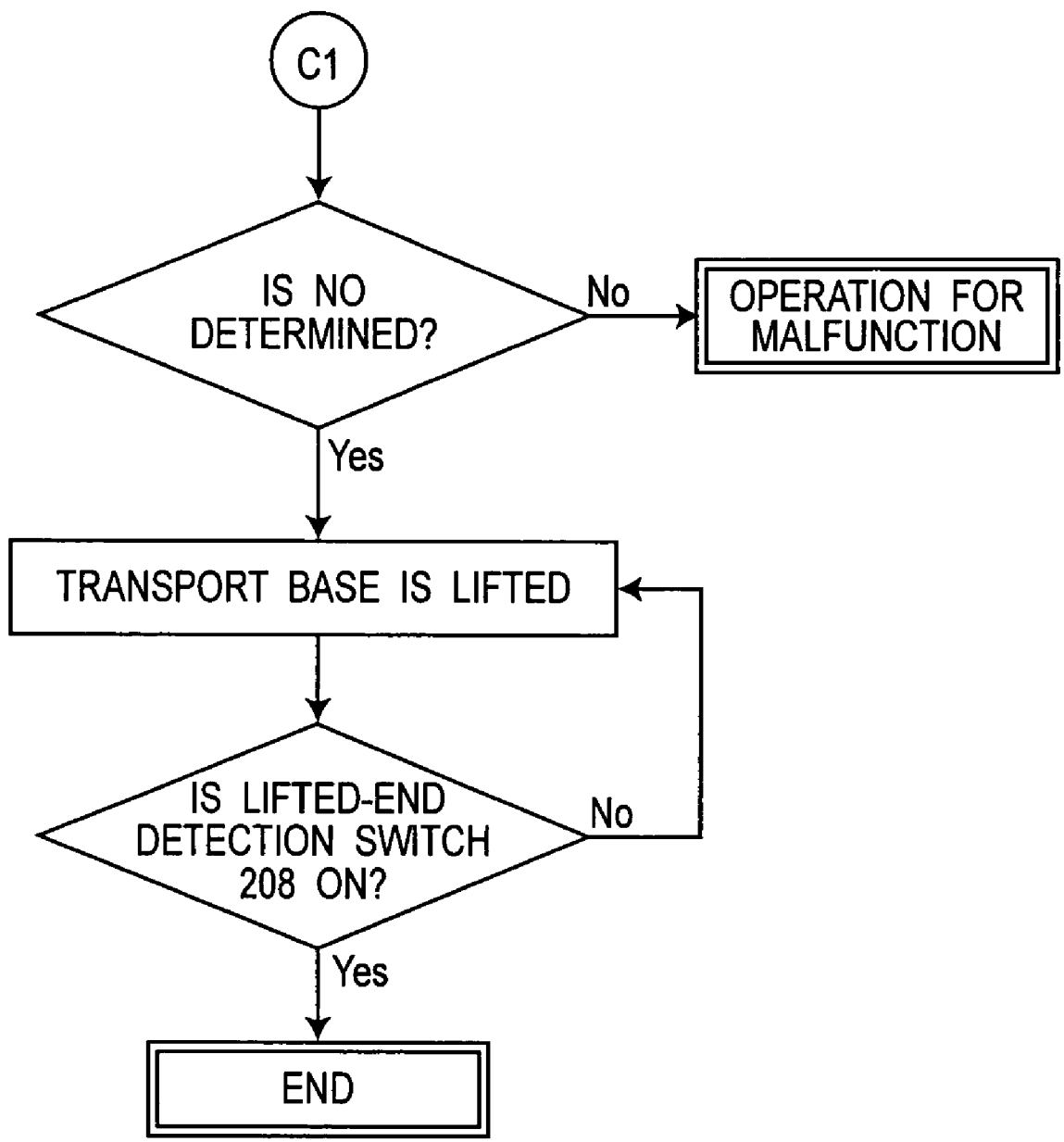
FIG. 18 is a flowchart showing operations of the disk drive according to the embodiment 1.

When the kind of the media is determined as NO according to the table 1, as shown in FIG. 18, the elevating motor 10 is rotated without changing the position of the first tray guide 20 in the Y-axis direction, that is, keeping the second conveyance driving motor 22 stopped, and the transport base 5 is turned in the direction of the arrow 101 shown in FIGS. 1 and 12 to be lifted. When the lifted end detection switch 208 becomes ON, the elevating motor 10 is stopped and in this state, the operation is completed.

According to the operational flows shown in FIGS. 16 to 18, although the kind of the media is distinguished when the inserting operation of the media tray 19 into the first tray guide 20 is completed, the present invention is not limited to this, this distinction may be made just after the media is set of the media tray 19 before the insertion instruction for the media tray 19 is input, for example. Thus, when the insertion instruction for the media tray 19 is input after that, the media tray 19 can be immediately moved to a predetermined position based on the distinction result.

In addition, when the force required for opening/closing the cartridge shutter 32A of the first disk cartridge 32 is different from that for opening/closing the cartridge shutter 38A of the second disk cartridge 38, since there is a difference in load when the shutter opening/closing mechanism shown in FIG. 5 is operated in the first disk cartridge 32 and in the second disk cartridge 38, a difference in conveying speed of the media tray 19 in the X-axis direction is generated. When the kind of the disk cartridge is distinguished at the time the media is set on the media tray 19, according to the distinction result, the above difference in conveyance speed can be eliminated by varying a voltage applied to the first conveyance driving motor 27, for example.

In addition, as a method of distinguishing the kind of the media, the present invention is not limited to the above method by the tray slider 39, the following method can be also used, for example.

It is assumed that there are notches 32C at sides perpendicular to sides along which the cartridge shutter 32A slides in the first disk cartridge 32 as shown in FIG. 3B, for example and this notch 32C does not exist in the second disk cartridge 38. Meanwhile, it is assumed that there are tapered faces 38C at both ends of sides along which the cartridge shutter 38A slides in the second disk cartridge 38 as shown in FIG. 4B, for example and this tapered face 38C does not exist in the first disk cartridge 32.

Figure 19:
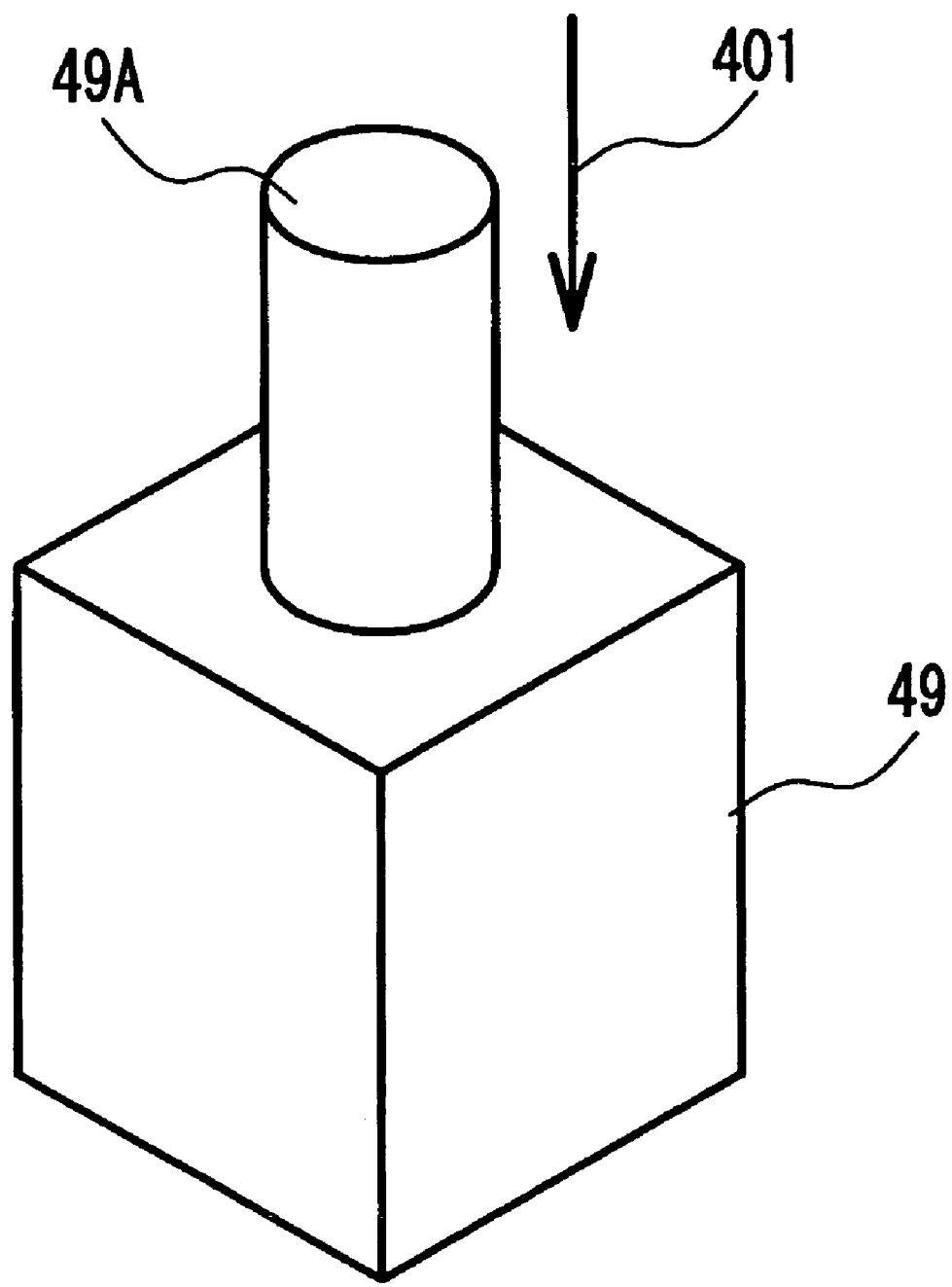
FIG. 19 is a perspective view showing an example of a detection switch for distinguishing the kind of the media in the disk drive according to the embodiment 1.

In this case, when detection switches which can detect the notch 32C and the tapered face 38C are provided on a face of the media tray 19 on which the media is set, the kind of the media can be distinguished from its detected result. FIG. 19 shows an example of a detection switch which can be used in the above case. Referring to FIG. 19, reference numeral 49A designates an up-and-down rod which can be moved in the direction of an arrow 401 and ON/OFF can be detected by bringing up and down this rod. When the detection switches 49 are set at the positions corresponding to the notch 32C and the tapered face 38C, respectively on a face of the media tray 10 on which the media is set, respectively, it can be detected whether the notch 32C and the tapered face 38C exist or not.

As described above, the disk drive according to the embodiment 1 includes optical heads 3A and 3B having two different specifications, and when the recording and/or reproducing operation is performed on the disk corresponding to either one of the optical heads, it can be determined which optical head is appropriate when the disk cartridge (or the bare disk) is set on the media tray 19.

According to the conventional disk drive shown in FIG. 24, when the disk is set on the disk motor and the disk motor is rotated, a signal such as focus signal, tracking signal and the like can be read by either one of the optical heads. At this time, it can be determined whether the optical head is appropriate to the disk or not. When it is determined that it is appropriate, a recording and/or reproducing operation is continued as it is, but when it is determined that it is not appropriate, an error is determined at this time and then the optical head must be exchanged and the same operation must be performed.

As explained above, according to the disk drive of this embodiment, since the kind of the disk can be distinguished before the disk is set on the disk motor, time after the disk is set on the media tray 19 until the recording and/or reproducing operation is started can be shortened.

In addition, since there are provided the detection switches for accurately detecting the position of the media tray 19 on which the disk is set in the X-axis direction and the Y-axis direction, malfunction can be prevented.

Furthermore, since the plurality of optical heads are arranged in a horizontal plane parallel to the disk surface, the dimension in the direction perpendicular to the disk surface, that is, the thickness direction of the device is hardly increased as compared with the disk drive on which only one optical head is mounted. Therefore, even though the plurality of optical heads are mounted so as to correspond to the plurality of kinds of disks, the disk drive can be decreased in thickness to the same level as in the disk drive having a single optical head.

Embodiment 2

According to the embodiment 1, arrangement of the plurality of optical heads is almost fixed and the optical disk media is conveyed to the position of the optical head corresponding to the kind of the optical disk media. Meanwhile, according to this embodiment, a description is made of a disk drive in which an optical head corresponding to the kind of the optical disk media inserted in the device is selected from the housed optical heads and it is moved toward the optical disk media. The concept of the disk drive has been already disclosed in an international application (International Publication No.: WO 03/032303 A1) by the inventors of the present invention, for example. This embodiment is described with reference to FIG. 20.

Figure 20:
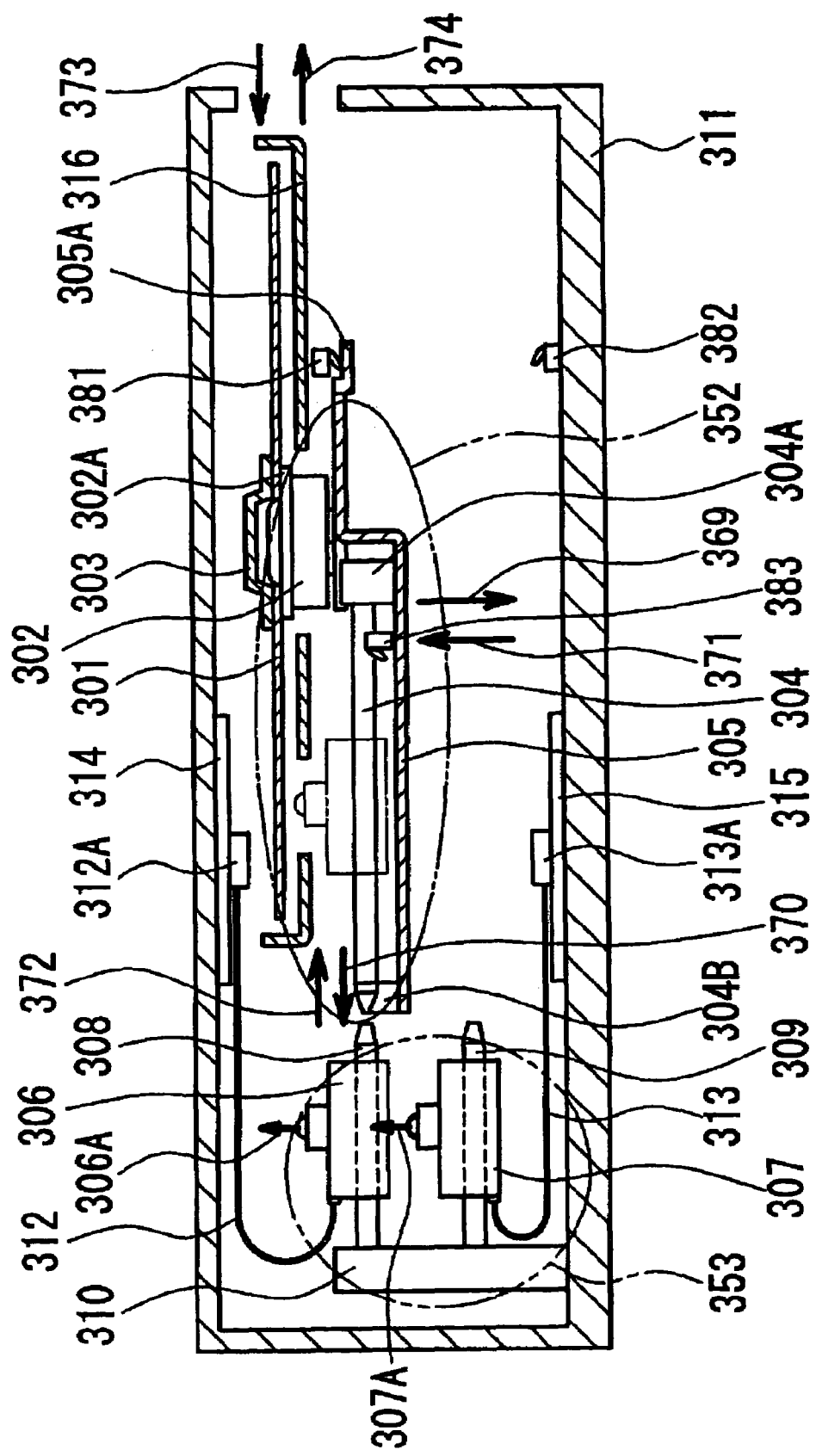
FIG. 20 is a side sectional view showing a schematic constitution of a disk drive according to an embodiment 2 of the present invention.

Referring to FIG. 20, reference numeral 301 designates an optical disk media, reference numeral 302 designates a disk motor, and the optical disk media 301 is set on a turntable 302A which is integrally rotated with a rotor of the disk motor 302 to be rotated. In addition, reference numeral 303 designates a clamper which clamps and holds the optical disk media 301 to the turntable 302A.

Reference numeral 304 designates a guide shaft for guiding the optical head so as to be conveyed in one radius direction of the optical disk media 301. FIG. 20 shows a state in which the optical head is not provided at the guide shaft 304. Reference numeral 305 designates a transport base in which the disk motor 302 and the guide shaft 304 are integrally arranged. The guide shaft 304 is supported so as to be upper than the transport base 305 by supporting members 304A and 304B. Thus, a transport unit 352 which performs the recording or reproducing operation on the optical disk media 301 is constituted.

Hereinafter, a description is made of a constitution of optical head housing mechanism for housing the plurality of optical heads outside of the transport unit 352. FIG. 20 shows a state in which two optical heads are housed outside of the transport unit 352. Reference numeral 306 designates a first optical head for recording or reproducing data on the optical disk media 301 and similarly, 307 designates a second optical head for recording or reproducing data on the optical disk media 301. Reference numerals 306A and 307A designate optical beam emitted from each of them on a conceptual basis, and the direction of arrows coincides with the emitted direction of the optical beam. The first optical head 306 and the second optical head 307 are housed so that the direction of the optical beam 306A and the direction of the optical beam 307A may coincide with each other.

Reference numeral 308 designates a first housing support guide which supports the first optical head 306 so as to be housed away from the guide shaft 304, reference numeral 309 designates a second housing support guide which supports the second optical head 307 so as to be housed away from the guide shaft 304, and reference numeral 310 designates a housing support base for holding the first and the second housing support guides.

As described above, an optical head housing part 353 consists of the first housing support guide 308, the second housing support guide 309 and the housing support base 310 and it is fixed in a case 311.

The transport unit 352 is lifted in the direction of an arrow 371 or lowered in the direction of an arrow 369 by transport unit elevating means (not shown) so that either one of the first optical head 306 and the second optical head 307 housed in the optical head housing part 353 is moved in the direction of an arrow 372 and equipped to the guide shaft 304 by optical head mounting/dismounting means (not shown), or so that the optical head equipped to the guide shaft 304 is moved in the direction of an arrow 370 by the optical head mounting/dismounting means and housed to either one of the first housing support guide 308 and the second housing support guide 309.

Referring to FIG. 20, reference numerals 312 and 313 designate a first flat cable and a second flat cable in which feeding lines or signal lines to the first optical head 306 and the second optical head 307 are bundled in a lump. These flat cables are connected to a first print substrate 314 and a second print substrate 315 which supply an electric power or a signal to both optical heads through a first connector 312A and a second connector 313A, respectively.

Reference numeral 316 designates a media tray. The media tray 316 is moved in the direction of an arrow 373 to take the optical disk media 301 set outside into the device, or moved in the direction of an arrow 374 to discharge the optical disk media out of the device. In addition, when the media tray 316 is inserted in the direction of the arrow 373 and discharged in the direction of the arrow 374, the transport unit 352 is lowered in the direction of the arrow 369 and stays at the position, so that the turntable 302A is prevented from interfering with the media tray 316.

In the case where the data is recorded or reproduced on the optical disk media 301 by the first optical head 306, when the optical disk 301 is inserted into the device, the transport unit 352 is lifted in the direction of the arrow 371, so that the optical disk media 301 is sandwiched by the turntable 302A and the clamper 303 and the optical disk media 301 is rotatably held with the turntable 302A. Then, the first optical head 306 is moved by the optical head mounting/dismounting means (not shown) in the direction of the arrow 372 and equipped to the guide shaft 304. Then, the first optical head 306 is transported by transport driving means (not shown) while guided by the guide shaft 304 and then it can perform the recording or reproducing operation on the optical disk 301.

Reference numeral 381 designates a transport unit lifted detection switch which detects that the transport unit 352 is lifted up to the end in the direction of the arrow 371, and reference numeral 382 designates a transport unit lowered detection switch which detects that the transport unit 352 is lowered to the end in the direction of the arrow 369. These are operated by a transport unit elevation detecting projection 305A provided at the transport base 305. Thus, the upper and lower position of the transport unit 352 can be determined.

In addition, reference numeral 383 designates an inner circumference detection switch which detects that the first optical head 306 (or the second optical head 307) exists at the most inner circumference position of the optical disk media 301 to be recorded or reproduced in the radius direction.

In addition, although a mechanism for moving the media tray 316 in the direction of the arrow 373 and the direction of the arrow 374 and its position detection device in this embodiment is not especially limited, they can be the same as the mechanism for moving the media tray 19 to the first tray guide 20 and its position detection device in the embodiment 1, for example. In addition, a mechanism for elevating the transport unit 352 and a mechanism for transporting the first optical head 306 (and the second optical head 307) in the radius direction of the optical disk media 301 are also not particularly limited.

Furthermore, the media tray 316 comprises a mechanism for opening and closing a shutter of a disk cartridge and determining means for distinguishing whether the optical disk media is set or not and the kind thereof, similar to the embodiment 1.

In this embodiment also, control of each operation depending on the kind of the optical disk media set on the media tray 316 is similar to that in the embodiment 1. Operational flows of the device are described with reference to FIGS. 21 to 23. In addition, the kind of the optical disk media set on the media tray 316 is determined according to the table 1.

A state in which the transport unit 352 is lowered and the transport unit lowered detection switch 382 is ON is set as a starting state of the operations.

Figure 21:
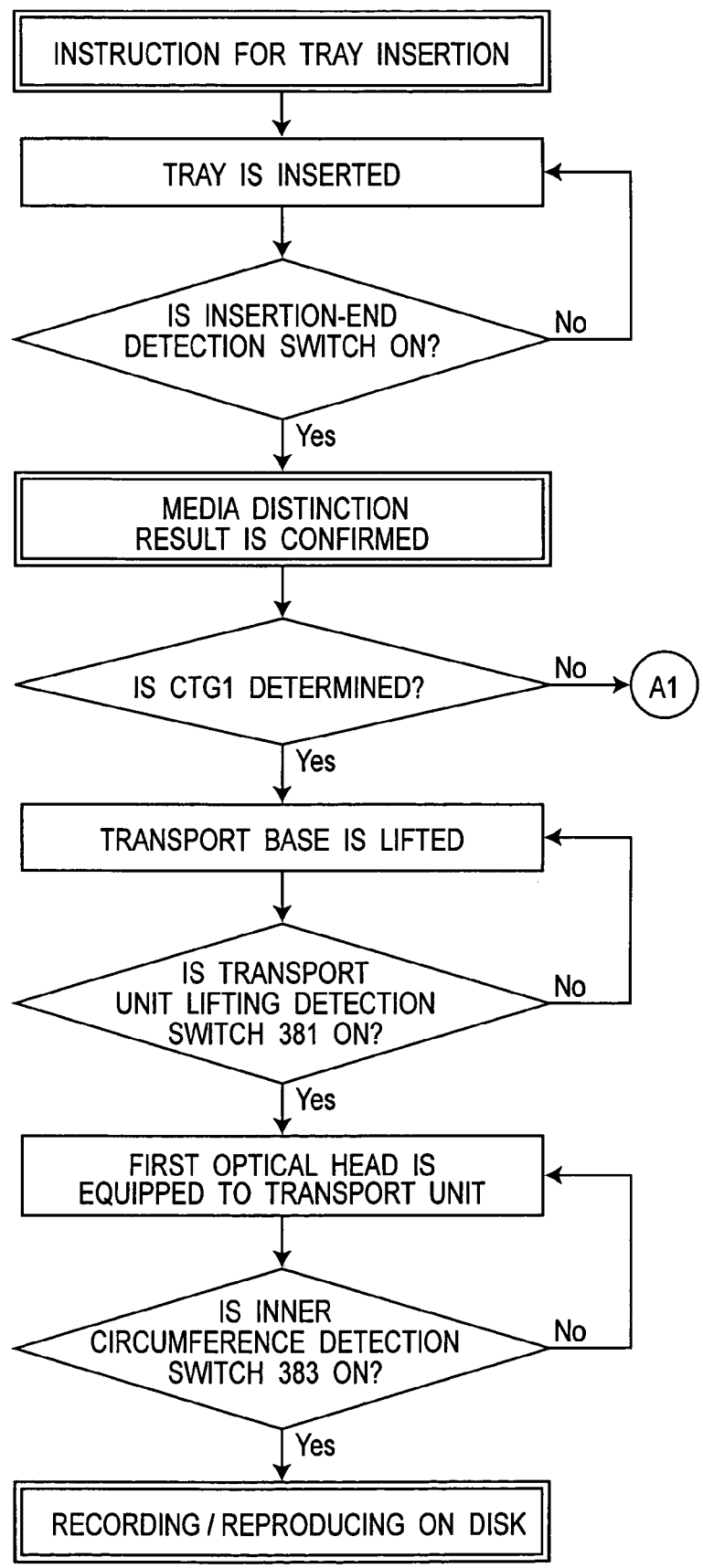
FIG. 21 is a flowchart showing operations of the disk drive according to the embodiment 2.

As shown in FIG. 21, when an instruction for inserting the media tray 316 is generated, a motor (not shown) for inserting the media tray 316 is rotated in the direction in which the media tray 316 is conveyed in the direction of the arrow 373 in FIG. 20. In addition, the instruction for inserting the media tray 316 means a trigger in which a user press an insertion/discharge switch (so called inject switch) or the media tray 316 is pressed by a hand of the user in the direction of the arrow 373 so that a switch corresponding to the discharge end detection switch 205 in the embodiment 1 becomes OFF. Then, the motor (not shown) for inserting the media tray 316 is rotated until a switch corresponding to the insertion end detection switch 206 in the embodiment 1 becomes ON.

When it is detected that a switch corresponding to the insertion end detection switch 206 in the embodiment 1 becomes ON, the kind of the media set on the media tray 316 is determined according to the table 1 like the embodiment 1.

When the kind of the media is determined as CTG1 according to the table 1, an elevating motor (not shown) for elevating the transport base 305 is rotated keeping the position of the media tray 316 as it is, and the transport base 305 is lifted in the direction of the arrow 371. When the transport unit lifted detection switch 381 becomes ON, the rotation of the elevating motor is stopped. Then, a motor for inserting/pulling out the optical head is rotated to move the first optical head 306 in the direction of the arrow 372 to the transport unit 352. When the inner circumference detection switch 383 becomes ON, the rotation of the motor for inserting/pulling out the optical head is stopped. Then, the recording or reproducing operation is performed on the disk.

Figure 22:
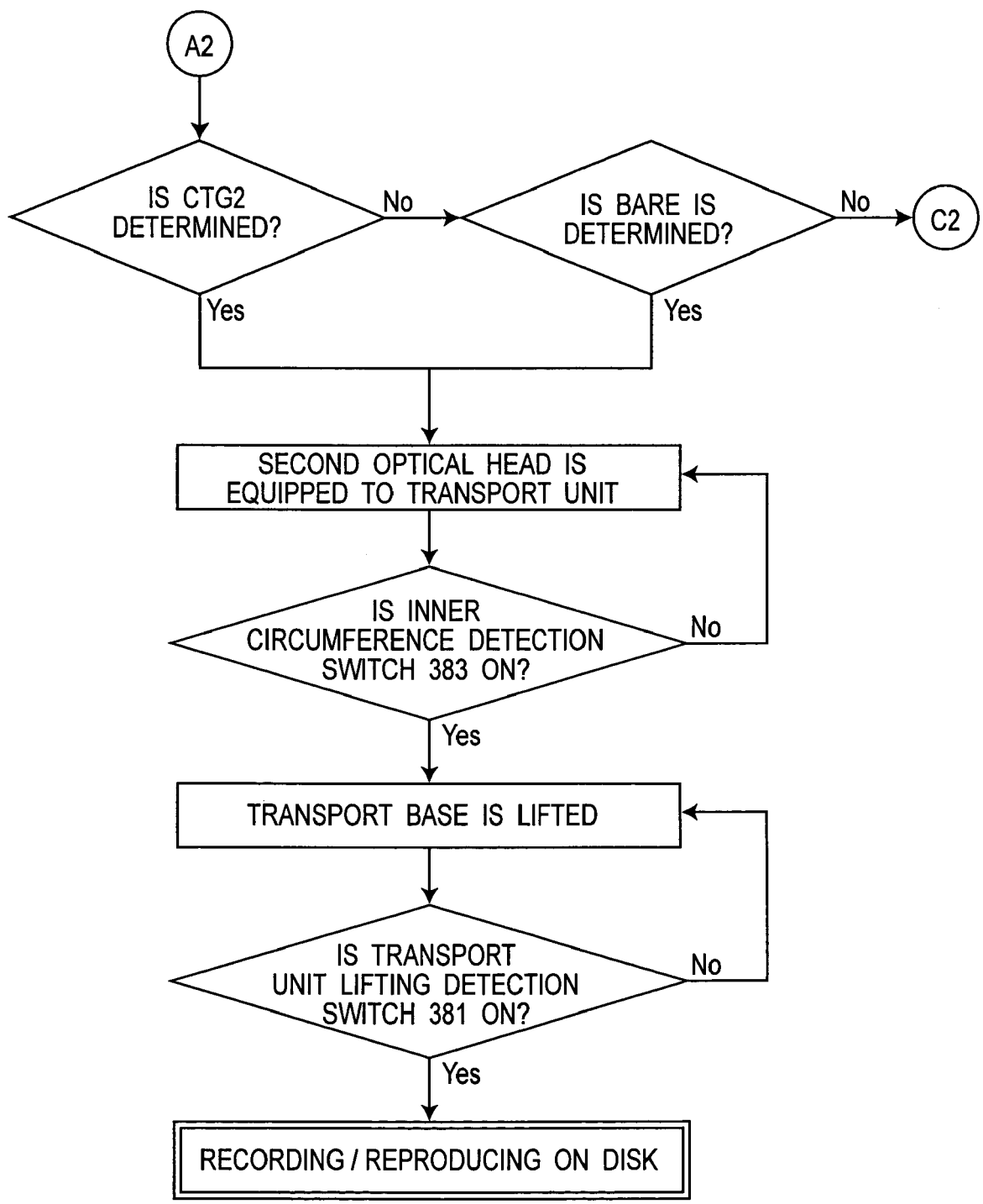
FIG. 22 is a flowchart showing operations of the disk drive according to the embodiment 2.

When the kind of the media is determined as CTG2 according to the table 1, as shown in FIG. 22, the motor for inserting/pulling out the optical head is rotated to move the second optical head 307 in the direction of the arrow 372 to the transport unit 352. When the inner circumference detection switch 383 becomes ON, the rotation of the motor for inserting/pulling out the optical head is stopped. Then, an elevating motor (not shown) for elevating the transport base 305 is rotated to lift the transport base 305 in the direction of the arrow 371. When the transport unit lifted detection switch 381 becomes ON, the rotation of the elevating motor is stopped. Then, the recording or reproducing operation is performed on the disk.

When the kind of the media is determined as BARE according to the table 1, the same operation as in the case of CTG2 is performed, and the recording or reproducing operation is performed on this disk.

Figure 23:
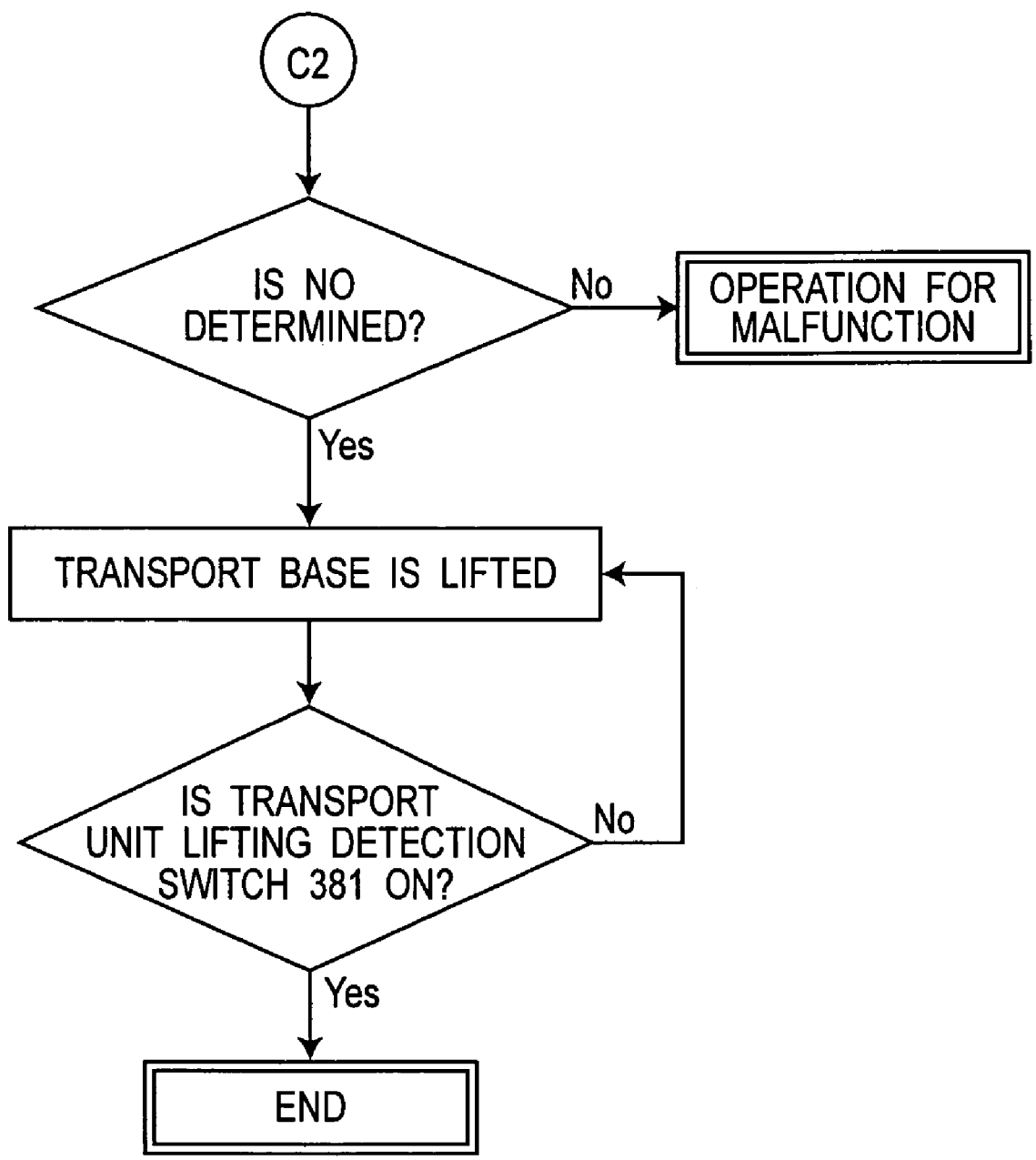
FIG. 23 is a flowchart showing operations of the disk drive according to the embodiment 2.

When the kind of the media is determined as NO according to the table 1, as shown in FIG. 23, the elevating motor (not shown) for elevating the transport base 305 is rotated to lift the transport base 305 in the direction of the arrow 371. When the transport unit lifted detection switch 381 becomes ON, the rotation of the elevating motor is stopped and in this state, the operation is completed.

According to the operational flows shown in FIGS. 21 to 23, although the kind of the media is determined when the inserting operation of the media tray 316 into the disk drive is completed, the present invention is not limited to this, this determination may be made just after the media is set on the media tray 316 before the insertion instruction of the media tray 316 is input, for example. Thus, when the insertion instruction of the media tray 316 is input after that, the optical head can be moved from the housing part to the transport base at the same time the media tray 316 is inserted, so that time until the recording or reproducing operation is started can be further shortened.

According to the embodiment 2, although the transport base 305 is moved to the position in which the optical head corresponding to the kind of the optical disk media is housed, the present invention is not limited to this. The position of the transport base 305 may not be moved and the optical head housing part may be moved to the position in which the selected optical head can be moved to the side of the transport base 305.

Furthermore, the determination of the kind of the optical disk media and the selection of the optical head used in the recording or reproducing operation which were described in the embodiment 2 can be combined in the conventional disk drive shown in FIG. 24. Thus, since the optical head can be selected without an error, similar to the above embodiments, time after the disk is set on the media tray until the recording and/or reproducing operation is started can be shortened.

However, the constitution for rotating the optical head housing part shown in FIG. 24 has the following problems.

First, it is necessary to make a rotation diameter of the rotating plate 503 larger than at least a larger one of a distance Wa between the first small guide shafts 502aL and 502aR and a distance Wb between the second guide shafts 502bL and 502bR. Therefore, a height H of the housing part 551 has to be more than the larger one of the distances Wa and Wb. Therefore, it becomes an obstacle to reduce the height dimension of the device.

Secondly, since feeding lines or the signal lines (not shown) connected to the optical head are twisted by the rotation of the rotating plate 503, it is forced to be in a curved state.

Therefore, as shown in FIG. 20, for example, the constitution in which the plurality of optical heads are housed so that emitted directions of the optical beam from them are the same is preferable.

Although the optical head housing parts may be linearly arranged so as to intersect with the guiding direction of the guide shaft 304 at right angles as in the embodiment 2, they may be housed so as to be arranged in a surface which intersects with the guiding direction of the guide shaft 304 at right angles.

In addition, the number of optical heads housed in the optical head housing parts is not limited to two and it may be three or more.

Similar to the embodiment 1, the disk drive according to the embodiment 2 comprises the optical heads 306 and 307 having different two specifications, and when the recording and/or reproducing operation is performed on the disk corresponding to either one of optical heads, it can be determined which optical head is appropriate when the disk cartridge (or the bare disk) is set on the media tray 316. Therefore, appropriate optical head can be selected for the disk set on the media tray 316 without an error and moved to the transport unit 352. As a result, the time after the disk is set on the media tray 316 until the recording and reproducing operation is started can be shortened.

The invention may be utilized in a recording/reproducing apparatus in which a recording or reproducing operation is performed on a disk-shaped recording medium such as CD or DVD, especially in a disk drive which includes a plurality of optical heads for performing a recording and/or reproducing operation of a data on an optical disk by light, and selects an optical head to be used depending on a condition so as to perform the recording and/or reproducing operation of the data on the optical disk corresponding to the optical head. By selecting a optical head correctly depending on the kind of the set disk, it can be prevented that the recording or reproducing operation is stopped and the disk is conveyed again, which is caused by mismatch between the disk and the optical head. As a result, the recording and/or reproducing operation can be performed smoothly and efficiently.

It is to be noted that the present invention is not limited to the above-described embodiments and may be modified or improved without departure from the gist of the invention.

What is claimed is:

1. A disk drive comprising:
   a first disk rotating mechanism for supporting and rotating a first disk on which data can be recorded and/or reproduced by a first optical beam;
   a first optical head emitting the first optical beam to perform a recording and/or reproducing operation on the first disk;
   a first optical head moving mechanism for moving the first optical head in the substantially radial direction of the first disk;
   a second disk rotating mechanism for supporting and rotating a second disk on which data can be recorded and/or reproduced by a second optical beam;
   a second optical head emitting the second optical beam to perform a recording and/or reproducing operation on the second disk;
   a second optical head moving mechanism for moving the second optical head in the substantially radial direction of the second disk;
   a transport base on which the first disk rotating mechanism, the first optical head, the first optical head moving mechanism, the second disk rotating mechanism, the second optical head, and the second optical head moving mechanism are mounted;
   a disk tray conveyed to a first tray position in which the recording and/or reproducing operation is performed on the first disk, a second tray position in which the recording and/or reproducing operation is performed on the second disk, and a third tray position in which the first disk and the second disk are set onto the disk tray or taken out of the disk tray;

a first disk tray conveying mechanism for conveying the disk tray in a first direction which is substantially perpendicular to a line connecting a rotation center of the first disk in the first tray position and a rotation center of the second disk in the second tray position and which is substantially parallel to the first disk surface and the second disk surface;

a second disk tray conveying mechanism for conveying the disk tray in a second direction which is parallel to the line connecting the rotation center of the first disk in the first tray position and the rotation center of the second disk in the second tray position and which is substantially parallel to the first disk surface and the second disk surface; and a disk distinction device for distinguishing whether the set disk is the first disk or the second disk when the disk is set on the disk tray, wherein the first disk tray conveying mechanism and/or the second disk tray conveying mechanism conveys the disk tray to the first tray position or the second tray position according to a result distinguished by the disk distinction device.

2. The disk drive according to claim 1, wherein the first disk tray conveying mechanism conveys the disk tray between the first tray position and the third tray position, and the second disk tray conveying mechanism conveys the disk tray between the first tray position and the second tray position.

3. The disk drive according to claim 1, wherein the first tray position, the second tray position and the third tray position are in substantially the same plane.

4. The disk drive according to claim 1, wherein the transport base is divided into a first transport base on which the first disk rotating mechanism, the first optical head, and the first optical head moving mechanism are mounted, and a second transport base on which the second disk rotating mechanism, the second optical head, and the second optical head moving mechanism are mounted.

5. The disk drive according to claim 1, wherein the first disk is set to or taken out of the first disk rotating mechanism, and the second disk is set to or taken out of the second disk rotating mechanism when the transport base comes close to or separates from the disk tray, respectively.

6. The disk drive according to claim 5, wherein the transport base is turnably supported, on an outer circumference side of the first disk or the second disk in generally radial direction thereof, around a shaft having a rotation axis line extends in a direction perpendicular to substantially radial direction of the first disk or the second disk and the rotation axis of the first disk or the second disk.

7. The disk drive according to claim 5, further comprising a lifted end detection device for detecting a state in which the first disk is mounted on the first disk rotating mechanism, or a state in which the second disk is mounted on the second disk rotating mechanism when the transport base comes close to the disk tray, and a lowered end detection device for detecting an end of an operation in which the transport base is separated from the disk tray.

8. The disk drive according to claim 7, wherein the lowered end detection device detects that the transport base is in an end state of the operation for separating from the disk tray when the disk tray is moved between the first tray position and the second tray position, and when the disk tray is moved between the first tray position and the third tray position.

9. The disk drive according to claim 5, wherein the first start-point detection device or the first end-point detection device detects that the disk tray is in the start-point position or the end-point position along the first direction when the transport base approaches the disk tray.

10. The disk drive according to claim 5, wherein the second start-point detection device or the second end-point detection device detects that the disk tray is in the start-point position or the end-point position along the second direction when the transport base approaches the disk tray.

11. The disk drive according to claim 8, further comprising a first inner circumference detection device for detecting that the first optical head is at the most inner circumference position within a movable range in substantially radial direction of the first disk, and a second inner circumference detection device for detecting that the second optical head is at the most inner circumference position within a movable range in substantially radial direction of the second disk.

12. The disk drive according to claim 11, wherein the first inner circumference detection device and the second inner circumference detection device detect that both the first optical head and the second optical head are at the most inner circumference position when the disk tray is moved between the first tray position and the second tray position, and when the disk tray is moved between the first tray position and the third tray position.

13. A disk drive comprising:
a first disk rotating mechanism for supporting and rotating a first disk on which data can be recorded and/or reproduced by a first optical beam;
a first optical head emitting the first optical beam to perform a recording and/or reproducing operation on the first disk;
a first optical head moving mechanism for moving the first optical head in the substantially radial direction of the first disk;
a second disk rotating mechanism for supporting and rotating a second disk on which data can be recorded and/or reproduced by a second optical beam;
a second optical head emitting the second optical beam to perform a recording and/or reproducing operation on the second disk;
a second optical head moving mechanism for moving the second optical head in the substantially radial direction of the second disk;
a transport base on which the first disk rotating mechanism, the first optical head, the first optical head moving mechanism, the second disk rotating mechanism, the second optical head, and the second optical head moving mechanism are mounted;
a disk tray conveyed to a first tray position in which the recording and/or reproducing operation is performed on the first disk, a second tray position in which the recording and/or reproducing operation is performed on the second disk, and a third tray position in which the first disk and the second disk are set onto the disk tray or taken out of the disk tray;
a first disk tray conveying mechanism for conveying the disk tray in a first direction which is substantially perpendicular to a line connecting a rotation center of the first disk in the first tray position and a rotation center of the second disk in the second tray position and which is substantially parallel to the first disk surface and the second disk surface;

a second disk tray conveying mechanism for conveying the disk tray in a second direction which is parallel to the line connecting the rotation center of the first disk in the first tray position and the rotation center of the second disk in the second tray position and which is substantially parallel to the first disk surface and the second disk surface;

a first start-point detection device and a first end-point detection device for detecting whether the disk tray exists in a start-point position and a end-point position of a conveyance path of the disk tray along the first direction or not, respectively; and a second start-point detection device and a second end-point detection device for detecting whether the disk tray exists in a start-point position and a end-point position of a conveyance path of the disk tray along the second direction or not, respectively.

14. The disk drive according to claim 13, wherein the first disk tray conveying mechanism conveys the disk tray between the first tray position and the third tray position, and the second disk tray conveying mechanism conveys the disk tray between the first tray position and the second tray position.

15. The disk drive according to claim 13, wherein the first tray position, the second tray position and the third tray position are in substantially the same plane.

16. The disk drive according to claim 13, wherein the transport base is divided into a first transport base on which the first disk rotating mechanism, the first optical head, and the first optical head moving mechanism are mounted, and a second transport base on which the second disk rotating mechanism, the second optical head, and the second optical head moving mechanism are mounted.

17. The disk drive according to claim 13, wherein the first disk is set to or taken out of the first disk rotating mechanism, and the second disk is set to or taken out of the second disk rotating mechanism when the transport base comes close to or separates from the disk tray, respectively.

18. The disk drive according to claim 17, wherein the transport base is turnably supported, on an outer circumference side of the first disk or the second disk in generally radial direction thereof, around a shaft having a rotation axis line extends in a direction perpendicular to substantially radial direction of the first disk or the second disk and the rotation axis of the first disk or the second disk.

19. The disk drive according to claim 17, further comprising a lifted end detection device for detecting a state in which the first disk is mounted on the first disk rotating mechanism, or a state in which the second disk is mounted on the second disk rotating mechanism when the transport base comes close to the disk tray, and a lowered end detection device for detecting an end of an operation in which the transport base is separated from the disk tray.

20. The disk drive according to claim 19, wherein the lowered end detection device detects that the transport base is in an end state of the operation for separating from the disk tray when the disk tray is moved between the first tray position and the second tray position, and when the disk tray is moved between the first tray position and the third tray position.

21. The disk drive according to claim 17, wherein the first start-point detection device or the first end-point detection device detects that the disk tray is in the start-point position or the end-point position along the first direction when the transport base approaches the disk tray.

22. The disk drive according to claim 17, wherein the second start-point detection device or the second end-point detection device detects that the disk tray is in the start-point position or the end-point position along the second direction when the transport base approaches the disk tray.

23. The disk drive according to claim 20, further comprising a first inner circumference detection device for detecting that the first optical head is at the most inner circumference position within a movable range in substantially radial direction of the first disk, and a second inner circumference detection device for detecting that the second optical head is at the most inner circumference position within a movable range in substantially radial direction of the second disk.

24. The disk drive according to claim 23, wherein the first inner circumference detection device and the second inner circumference detection device detect that both the first optical head and the second optical head are at the most inner circumference position when the disk tray is moved between the first tray position and the second tray position, and when the disk tray is moved between the first tray position and the third tray position.

25. A disk drive comprising:
a disk rotating mechanism for supporting and rotating a disk;
a plurality of optical heads emitting an optical beam to perform a recording and/or reproducing operation on the disk;
an optical head guiding mechanism for guiding the optical head in a substantially radial direction of the disk;
a transport unit comprising the disk rotating mechanism, the optical head guiding mechanism, and a transport base on which the disk rotating mechanism and the optical head guiding mechanism are mounted;
an optical head housing mechanism arranged on the side opposite to the disk rotating mechanism with respect to the optical head guiding mechanism, for housing the plurality of optical heads;
a disk tray conveyed to a first tray position in which the disk is supported and rotated by the disk rotating mechanism and a second tray position in which the disk is set onto the disk tray or taken out of the disk tray; and
a disk distinction device for distinguishing the kind of the set disk and selecting the optical head for performing the recording and/or reproducing operation on the set disk from the plurality of optical heads when the disk is set on the disk tray,
wherein the transport unit or the optical head housing mechanism is moved so that the optical head selected by the disk distinction device can be linearly moved from the optical head housing mechanism to the transport unit.

26. The disk drive according to claim 25, wherein the direction in which the selected optical head is moved from the optical head housing mechanism to the transport unit is the same as the guiding direction of the optical head by the optical head guiding mechanism.

27. The disk drive according to claim 25, wherein the plurality of optical heads are arranged and housed in the optical head housing mechanism such that the optical beam emitted from respective optical heads is in the same direction.

28. The disk drive according to claim 25, wherein the arranged direction of the plurality of optical heads housed in the optical head housing mechanism is substantially perpendicular to the guiding direction of the optical head by the optical head guiding mechanism.

29. The disk drive according to claim 25, further comprising a first inner circumference detection device for detecting that the first optical head is at the most inner circumference position within a movable range in substantially radial direction of the first disk, and a second inner circumference detection device for detecting that the second optical head is at the most inner circumference position within a movable range in substantially radial direction of the second disk.

30. The disk drive according to claim 29, wherein the first inner circumference detection device and the second inner circumference detection device detect that both the first optical head and the second optical head are at the most inner circumference position when the disk tray is moved between the first tray position and the second tray position, and when the disk tray is moved between the first tray position and the third tray position.

31. The disk drive according to claim 1, wherein the first disk is contained in a first disk cartridge, and the second disk is contained in a second disk cartridge having an outer configuration at least a part of which is different from that of the first disk cartridge.

32. The disk drive according to claim 31, wherein the disk distinction device comprises a first detection switch and a second detection switch, and any one of a case where the first disk cartridge is set on the disk tray, a case where the second disk cartridge is set on the disk tray and a case where neither the first disk cartridge nor the second disk cartridge is set on the disk tray is determined by combination of states detected by the first detection switch and the second detection switch.

33. The disk drive according to claim 1, further comprising a media detection device for detecting that the first disk and/or the second disk, or a first disk cartridge containing the first disk and/or a second disk cartridge containing the second disk are set on the disk tray.

34. The disk drive according to claim 33, wherein the media detection device comprises a light emitting element and a light receiving element and detects whether the disk exists on the disk tray or not based on a detection state of light emitted from the light emitting element, which is received by the light receiving element.

35. The disk drive according to claim 34, wherein a light emitting time of the light emitting element or a light receiving time of the light receiving element is only a specific time after the disk tray is moved from the third tray position to the first tray position, or a specific time after the disk tray is moved from the second tray position to the first tray position.

36. The disk drive according to claim 33, wherein the disk tray is not moved to the second tray position in a case where the media detection device does not detect any disk nor any disk cartridge on the disk tray when the disk tray is moved from the third tray position to the first tray position.

37. The disk drive according to claim 13, wherein the first disk is contained in a first disk cartridge, and the second disk is contained in a second disk cartridge having an outer configuration at least a part of which is different from that of the first disk cartridge.

38. The disk drive according to claim 25, wherein the first disk is contained in a first disk cartridge, and the second disk is contained in a second disk cartridge having an outer configuration at least a part of which is different from that of the first disk cartridge.

39. The disk drive according to claim 37, wherein the disk distinction device comprises a first detection switch and a second detection switch, and any one of a case where the first disk cartridge is set on the disk tray, a case where the second disk cartridge is set on the disk tray and a case where neither the first disk cartridge nor the second disk cartridge is set on the disk tray is determined by combination of states detected by the first detection switch and the second detection switch.

40. The disk drive according to claim 38, wherein the disk distinction device comprises a first detection switch and a second detection switch, and any one of a case where the first disk cartridge is set on the disk tray, a case where the second disk cartridge is set on the disk tray and a case where neither the first disk cartridge nor the second disk cartridge is set on the disk tray is determined by combination of states detected by the first detection switch and the second detection switch.

* * * * *